(12) United States Patent
Wang et al.

(10) Patent No.: US 12,707,310 B2
(45) Date of Patent: Aug. 11, 2026

(54) CHANNEL STATE INFORMATION CSI REPORT MAPPING METHOD, TERMINAL, AND NETWORK-SIDE DEVICE

(71) Applicant: VIVO MOBILE COMMUNICATION CO., LTD., Guangdong (CN)

(72) Inventors: Chenxi Wang, Guangdong (CN); Yang Song, Guangdong (CN); Peng Sun, Guangdong (CN); Rakesh Tamrakar, Guangdong (CN); Jiangwei Yuan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 238 days.

(21) Appl. No.: 18/476,644

(22) Filed: Sep. 28, 2023

(65) Prior Publication Data

US 2024/0022302 A1 Jan. 18, 2024

Related U.S. Application Data

(63) Continuation of application No. PCT/CN2022/083449, filed on Mar. 28, 2022.

(30) Foreign Application Priority Data

Mar. 29, 2021 (CN) ........................ 202110336986.X

(51) Int. Cl.
*H04B 17/20* (2015.01)
*H04B 17/24* (2015.01)
(Continued)

(52) U.S. Cl.
CPC ............ *H04W 24/10* (2013.01); *H04B 17/24* (2015.01); *H04B 17/252* (2023.05);
(Continued)

(58) Field of Classification Search
CPC .. H04B 7/02–12; H04B 17/0082–3913; H04L 1/00–0039; H04L 5/00–0098;
(Continued)

(56) References Cited

U.S. PATENT DOCUMENTS

2019/0053183 A1 2/2019 Park et al.
2020/0059290 A1 2/2020 Pan et al.
(Continued)

FOREIGN PATENT DOCUMENTS

CN 109391344 A 2/2019
CN 110381531 A 10/2019
(Continued)

OTHER PUBLICATIONS

NTT Docomo, Inc, "Discussion on beam management for MTRP", 3GPP TSG RAN WG1 #103-e, R1-2009177, e-Meeting, Oct. 26-Nov. 13, 2020.
(Continued)

*Primary Examiner* — Timothy J Weidner
(74) *Attorney, Agent, or Firm* — Price Heneveld LLP

(57) ABSTRACT

A channel state information CSI report mapping method, a terminal, and a network-side device. The CSI report mapping method in embodiments of this application includes: a terminal feeds back X CSI reports to a network-side device through a target channel according to a preset mapping rule, where the CSI report includes at least one of the following: information for indicating a beam reporting type and information about target beams; the target beams include at least one of the following: N pairs of first beams that can be simultaneously received by the terminal, and M second beams whose measurement values satisfy a predetermined condition, where N is a positive integer greater than or equal
(Continued)

A terminal device feeds back X CSI reports to a network-side device through a target channel according to a preset mapping rule — 201 to 1, and X and M are positive integers; and the preset mapping rule is a mapping rule that matches the beam reporting type.

18 Claims, 9 Drawing Sheets

(51) Int. Cl.

| | |
|---|---|
| ***H04W 24/08*** | (2009.01) |
| ***H04W 24/10*** | (2009.01) |
| ***H04W 84/02*** | (2009.01) |
| ***H04W 88/02*** | (2009.01) |
| ***H04W 88/08*** | (2009.01) |
| ***H04W 92/02*** | (2009.01) |
| ***H04W 92/10*** | (2009.01) |

(52) U.S. Cl.
CPC ............ *H04W 24/08* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ........... H04W 24/02–10; H04W 36/0005–385; H04W 72/02–569; H04W 84/02–16; H04W 88/02–12; H04W 92/02–04; H04W 92/10
See application file for complete search history.

(56) References Cited

U.S. PATENT DOCUMENTS

| | | | | |
|---|---|---|---|---|
| 2020/0170027 | A1 | 5/2020 | Yang et al. | |
| 2020/0178175 | A1 | 6/2020 | Jung et al. | |
| 2021/0022130 | A1 | 1/2021 | Gao et al. | |
| 2021/0076241 | A1 | 3/2021 | Yang et al. | |
| 2021/0184733 | A1* | 6/2021 | Cao | H04W 24/10 |
| 2021/0235513 | A1 | 7/2021 | Kim et al. | |
| 2021/0258057 | A1 | 8/2021 | Kim et al. | |
| 2022/0295323 | A1 | 9/2022 | Wang | |
| 2023/0189270 | A1* | 6/2023 | Matsumura | H04W 24/10 |
| 2024/0014875 | A1* | 1/2024 | Yuan | H04W 24/10 |

FOREIGN PATENT DOCUMENTS

| | | | |
|---|---|---|---|
| CN | 111344980 | A | 6/2020 |
| CN | 111435864 | A | 7/2020 |
| CN | 111903101 | A | 11/2020 |
| CN | 111970726 | A | 11/2020 |
| CN | 112042217 | A | 12/2020 |
| CN | 112166637 | A | 1/2021 |

OTHER PUBLICATIONS

Moderator (CATT) "Moderator summary on M-TRP simultaneous transmission with multiple Rx panels (round 0)" 3GPP TSG RAN WG1 Meeting #104-e, R1-2101862, E-meeting, Jan. 25-Feb. 5, 2021.

First Korean Office Action for Korean Patent Application No. 10-2023-7036174, dispatched Dec. 15, 2025, 16 pages.

"3rd Generation Partnership Project; Technical Specification Group Radio Access Network; NR; Radio Resource Control (RRC) protocol specification (Release 16)", 3GPP TS 38.331 V16.2.0 (Sep. 2020), Valbonne, France.

Apple Inc., "On Multi-TRP Beam Management Enhancement", 3GPP TSG- RAN WG1 Meeting #103-e, R1-2008441, e-Meeting, Oct. 26-Nov. 13, 2020.

* cited by examiner

A terminal device feeds back X CSI reports to a network-side device through a target channel according to a preset mapping rule

201

CHANNEL STATE INFORMATION CSI REPORT MAPPING METHOD, TERMINAL, AND NETWORK-SIDE DEVICE

CROSS-REFERENCE TO RELATED APPLICATIONS

This application is a continuation application of International Application No. PCT/CN2022/083449 filed on Mar. 28, 2022, which claims priority to Chinese Patent Application No. 202110336986.X, filed in China on Mar. 29, 2021, which are incorporated herein by reference in their entireties.

TECHNICAL FIELD

This application relates to the field of communications technologies, and specifically, to a channel state information CSI report mapping method, a terminal, and a network-side device.

BACKGROUND

In a communications system, after a terminal reports channel state information (CSI) to a base station, the base station adjusts communication scheduling and a transmission mode based on reported CSI content, so that the terminal can complete normal communication in the communications system. Therefore, the reporting of CSI is very important.

In the related art, before the terminal reports the CSI, the terminal first measures a channel state information reference signal (CSI-RS) or a synchronization signal and PBCH block (SSB) configured or activated by a network-side device. Then the terminal determines content of the CSI report based on beam reporting and a beam report quantity in a CSI report configuration configured by the network-side device. The terminal maps the content of the CSI report to uplink control information (UCI) according to a mapping rule configured by the network-side device, and feeds back the content of the CSI report to the network-side device through a PUCCH or a PUSCH, so that the base station subsequently establishes, with the terminal, a communication transmission that the terminal can receive. When a beam reporting type of a CSI-RS resource is a group-based beam reporting type, the terminal reports information about a pair of beams that can be simultaneously received by the terminal.

However, in a process of reporting the CSI by the terminal, in a case that the beam reporting type configured by the base station is group-based beam reporting, there is no suitable mapping manner for simultaneously reporting information about a plurality of pairs of beams.

SUMMARY

Embodiments of this application provide a channel state information CSI report mapping method, a terminal, and a network-side device.

According to a first aspect, a channel state information CSI report mapping method is provided. The method includes: feeding back, by a terminal, X CSI reports to a network-side device through a target channel according to a preset mapping rule, where the CSI report includes at least one of the following: information for indicating a beam reporting type and information about target beams; the target beams include at least one of the following: N pairs of first beams that can be simultaneously received by the terminal, and M second beams whose measurement values satisfy a predetermined condition, where N is a positive integer greater than or equal to 1, and X and M are positive integers; and the preset mapping rule is a mapping rule that matches the beam reporting type.

According to a second aspect, a channel state information CSI report mapping apparatus is provided. The apparatus includes a feedback module. The feedback module is configured to feed back X CSI reports to a network-side device through a target channel according to a preset mapping rule, where the CSI report includes at least one of the following: information for indicating a beam reporting type and information about target beams; the target beams include at least one of the following: N pairs of first beams that can be simultaneously received by a terminal, and M second beams whose measurement values satisfy a predetermined condition, where N is a positive integer greater than or equal to 1, and X and M are positive integers; and the preset mapping rule is a mapping rule that matches the beam reporting type.

According to a third aspect, a channel state information CSI report mapping method is provided. The method includes: receiving, by a network-side device, a CSI report reported by a terminal; and parsing, by the network-side device, the CSI report based on a beam reporting type, where the CSI report includes at least one of the following: information for indicating the beam reporting type and information about target beams; the target beams include at least one of the following: N pairs of first beams that can be simultaneously received by the terminal, and M second beams whose measurement values satisfy a predetermined condition, where N is a positive integer greater than or equal to 1, and M is a positive integer; the beam reporting type is configured by the network-side device for the terminal, or determined by the terminal according to a preset rule of the network-side device; and the beam reporting type includes at least one of the following: group-based beam reporting, non-group-based beam reporting, and group-based and non-group-based hybrid beam reporting.

According to a fourth aspect, a channel state information CSI report mapping apparatus is provided. The apparatus includes a receiving module and a parsing module. The receiving module is configured to receive a CSI report reported by a terminal. The parsing module is configured to parse the CSI report based on a beam reporting type, where the CSI report includes at least one of the following: information for indicating the beam reporting type and information about target beams; the target beams include at least one of the following: N pairs of first beams that can be simultaneously received by the terminal, and M second beams whose measurement values satisfy a predetermined condition, where N is a positive integer greater than or equal to 1, and M is a positive integer; and the beam reporting type is configured by a network-side device for the terminal, or determined by the terminal according to a preset rule of a network-side device; and the beam reporting type includes at least one of the following: group-based beam reporting, non-group-based beam reporting, and group-based and non-group-based hybrid beam reporting.

According to a fifth aspect, a terminal is provided. The terminal includes a processor, a memory, and a program or instructions stored in the memory and capable of running on the processor. When the program or instructions are executed by the processor, the steps of the method according to the first aspect are implemented.

According to a sixth aspect, a terminal is provided and includes a processor and a communications interface. The communications interface is configured to feed back X CSI reports to a network-side device through a target channel according to a preset mapping rule, where the CSI report includes at least one of the following: information for indicating a beam reporting type and information about target beams; the target beams include at least one of the following: N pairs of first beams that can be simultaneously received by the terminal, and M second beams whose measurement values satisfy a predetermined condition, where N is a positive integer greater than or equal to 1, and X and M are positive integers; and the preset mapping rule is a mapping rule that matches the beam reporting type.

According to a seventh aspect, a network-side device is provided. The network-side device includes a processor, a memory, and a program or instructions stored in the memory and capable of running on the processor. When the program or instructions are executed by the processor, the steps of the method according to the first aspect are implemented.

According to an eighth aspect, a network-side device is provided and includes a processor and a communications interface. The communications interface is configured to receive a CSI report reported by a terminal. The processor is configured to parse the CSI report based on a beam reporting type, where the CSI report includes at least one of the following: information for indicating the beam reporting type and information about target beams; the target beams include at least one of the following: N pairs of first beams that can be simultaneously received by the terminal, and M second beams whose measurement values satisfy a predetermined condition, where N is a positive integer greater than or equal to 1, and M is a positive integer; the beam reporting type is configured by the network-side device for the terminal, or determined by the terminal according to a preset rule of the network-side device; and the beam reporting type includes at least one of the following: group-based beam reporting, non-group-based beam reporting, and group-based and non-group-based hybrid beam reporting.

According to a ninth aspect, a readable storage medium is provided. The readable storage medium stores a program or instructions. When the program or instructions are executed by a processor, the steps of the method according to the first aspect are implemented, or the steps of the method according to the third aspect are implemented.

According to a tenth aspect, a chip is provided. The chip includes a processor and a communications interface. The communications interface is coupled to the processor. The processor is configured to run a program or instructions to implement the method according to the first aspect or implement the method according to the third aspect.

According to an eleventh aspect, a computer program or program product is provided. The computer program or program product is stored in a storage medium. The computer program or program product is executed by at least one processor to implement the steps of the method according to the first aspect or implement the steps of the method according to the third aspect.

In the embodiments of this application, the terminal maps the X CSI reports (the CSI report includes the information for indicating the beam reporting type and/or the information about the target beams) to uplink control information (Uplink Control Information, UCI) according to the preset mapping rule matching the beam reporting type, and feeds back the X CSI reports to the network-side device through the target channel (for example, a physical uplink control channel (PUCCH) or a physical uplink shared channel (PUSCH)), so that the network-side device performs communication and transmission with the terminal based on a mapping result reported by the terminal. In the foregoing process, because the target beams include the N pairs of first beams that can be simultaneously received by the terminal, (N is a positive integer greater than 1), and/or the M second beams whose measurement values satisfy the predetermined condition (M is a positive integer), in a case that the beam reporting type is group-based beam reporting, the method provided in the embodiments of this application can enable the terminal to simultaneously report a plurality of pairs of beams, instead of reporting only one pair of beams.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, the new radio (NR) system is described for an illustrative purpose, and NR terms are used in most of the following descriptions. These technologies may also be applied to other applications than an NR system application, for example, a 6th Generation (6G) communications system.

Figures 1, 2:
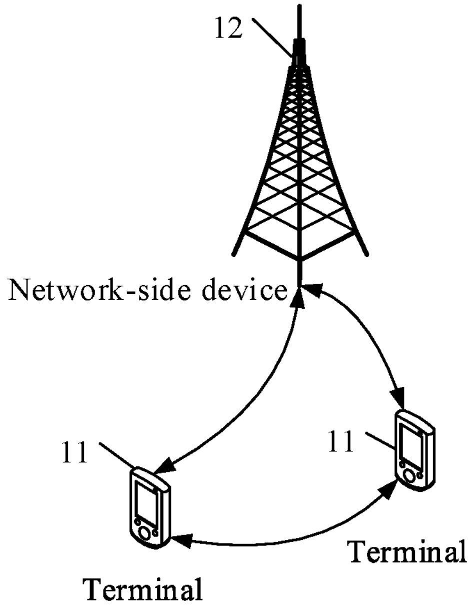
FIG. 1 is a diagram of a system architecture of a communications system according to an embodiment of this application.
FIG. 2 is a first flowchart of a channel state information CSI report mapping method according to an embodiment of this application.

FIG. 1 is a diagram of a system architecture of a wireless communications system to which an embodiment of this application may be applied. The wireless communications system includes a terminal 11 and a network-side device 12. The terminal 11 may also be referred to as a terminal device or a user terminal (UE). The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, a vehicular user equipment (VUE), or a pedestrian user equipment (PUE). The wearable device includes a smart watch, a smart band, an earphone, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception point (TRP), or another appropriate term in the art, as long as the same technical effect is achieved. The base station is not limited to specific technical terms. It should be noted that in the embodiments of this application, only a base station in an NR system is used as an example, but a specific type of the base station is not limited.

The following describes the terms used in the embodiments.

1. Beam Reporting

In a high-frequency (such as a frequency band above 6 gigahertz (GHz)) scenario of a fifth generation (5G) communications system (which may also be known as a new radio (NR) communications system) or a communications system after 5G, a signal can be transmitted between a base station and a terminal by using a millimeter-wave frequency band. Because the millimeter-wave frequency band has characteristics of large attenuation and a weak diffraction capability, problems such as significant signal fading and path loss increase are likely to occur when the signal is transmitted by using the millimeter-wave frequency band. To avoid these problems, an analog beamforming technology is used between the base station and the terminal to transmit the signal. For example, the base station may centralize signals on one transmit beam and send the signals to the terminal, and the terminal may receive the signals on a receive beam corresponding to the transmit beam. This improves channel quality of a transmission channel between the base station and the terminal, and overcomes the problems of significant signal fading and path loss increase caused by high-frequency communication.

In the related art, there are mainly two types of beam reporting: group-based beam reporting and non-group-based beam reporting. Group-based beam reporting means that a terminal reports information about beams that can be simultaneously received by the terminal. Currently, a protocol supports reporting of only two CRIs or SSBRIs and corresponding layer 1 measurement values (L1-RSRPs or L1-SINRs) thereof. Non-group-based beam reporting means that the terminal reports information about a beam whose layer 1 measurement value (L1-RSRPs or L1-SINRs) is largest. Currently, a protocol supports reporting of up to four CRIs or SSBRIs and corresponding L1-RSRPs or L1-SINRs thereof, and does not require that beams should be simultaneously received by the terminal.

2. CSI Report Mapping Manner

In the related art, if a groupBasedBeamReporting field is configured in a CSI report configuration (CSI Report Config) and a report quantity field is configured as "cri-rsrp" or "cri-sinr", it indicates that the current CSI report includes information about beams.

When the groupBasedBeamReporting field is "enabled", UE can report only one pair of beams, including two CMR identifiers (CRIs or SSBRIs) and corresponding L1-RSRP or L1-SINR values thereof. When the groupBasedBeamReporting field is "disabled", the UE may report CMR identifiers corresponding to four beams and corresponding L1-RSRP or L1-SINRs thereof.

When a beam report quantity is greater than 1, differential reporting is performed on a largest L1-RSRP or L1-SINR value and other L1-RSRP values or L1-SINR values than the largest value. A specific rule for mapping a CSI report (L1-RSRP) to UCI is shown in Table 1, and a similar rule is applied to the L1-SINR. It should be noted that a CRI or SSBRI position corresponds to an RSRP position, and CRI or SSBRI #1 corresponds to RSRP #1, and RSRP #1 is a largest one of the four RSRPs.

TABLE 1

| CSI report number | CSI fields |
|---|---|
| CSI report #n | CRI or SSBRI #1 as in Table 6.3.1.1.2-6, if reported<br>CRI or SSBRI #2 as in Table 6.3.1.1.2-6, if reported<br>CRI or SSBRI #3 as in Table 6.3.1.1.2-6, if reported<br>CRI or SSBRI #4 as in Table 6.3.1.1.2-6, if reported<br>RSRP #1 as in Table 6.3.1.1.2-6, if reported<br>Differential RSRP #2 as in Table 6.3.1.1.2-6, if reported<br>Differential RSRP #3 as in Table 6.3.1.1.2-6, if reported<br>Differential RSRP #4 as in Table 6.3.1.1.2-6, if reported |

Table 2 shows quantities of UCI bits of a CMR identifier and an L1-RSRP. A quantity of UCI bits of an L1-SINR is similar.

TABLE 2

| Field | Bitwidth |
| --- | --- |
| CRI | $\lceil \log_2(K_s^{CSI-RS}) \rceil$ |
| SSBRI | $\lceil \log_2(K_s^{SSB}) \rceil$ |
| RSRP | 7 |
| Differential RSRP | 4 |

$$K_s^{CSI-RS}$$

is a quantity of CSI-RS resources configured in one CSI-RS resource configuration, and $$K_s^{SSB}$$

is a quantity of SSB resources configured in one SSB resource set. A current protocol supports configuring a maximum of 64 RS resources in one CMR (CSI-RS or SSB) set.

A channel state information CSI report mapping method provided in the embodiments of this application is hereinafter described in detail by using some embodiments and application scenarios thereof with reference to the accompanying drawings.

FIG. 2 is a schematic flowchart of a channel state information CSI report mapping method according to an embodiment of this application. As shown in FIG. 2, the method is applied to UE, and the channel state information CSI report mapping method may include step 201.

Step 201: A terminal feeds back X CSI reports to a network-side device through a target channel according to a preset mapping rule.

In this embodiment of this application, the CSI report includes at least one of the following: information for indicating a beam reporting type and information about target beams.

In this embodiment of this application, the preset mapping rule is a mapping rule that matches the beam reporting type.

In this embodiment of this application, the beam reporting type may include: group-based beam reporting, non-group-based beam reporting, and group-based and non-group-based hybrid beam reporting.

In this embodiment of this application, the beam reporting type is configured by the network-side device for the terminal, or determined by the terminal according to a preset rule of the network-side device.

For example, the preset rule is a rule for the terminal to determine, based on an actual measurement situation of CSI-RS or SSB resources configured by the network-side device, which specific beam reporting type is to be used. For example, when the terminal detects that, in the CSI-RS resources configured by the network-side device, there are two pairs of beams that can be simultaneously received and two beams with very large layer 1 measurement values, if a sum of layer 1 measurement values of one pair of beams that can be simultaneously received is smaller than a smallest one of layer 1 measurement values of two beams that cannot be simultaneously received, hybrid beam reporting is used; otherwise, group-based beam reporting is used.

In this embodiment of this application, the target beams include at least one of the following: N pairs of first beams that can be simultaneously received by the terminal, and M second beams that satisfy a predetermined condition, where N is a positive integer greater than or equal to 1, and X and M are positive integers.

In this way, in the process of reporting CSI by the terminal, the following problem can be avoided: The terminal can only select, based on the beam reporting type configured by the network-side device, a beam that satisfies a corresponding condition for reporting, and cannot implement beam reporting and flexible switching between application scenarios corresponding to the reported beams. The terminal can implement group-based and non-group-based hybrid beam reporting. In addition, the terminal can autonomously perform beam reporting based on the beam reporting type determined by the preset rule of the network-side device, so that the determination of the beam reporting type is more diverse.

Optionally, in this embodiment of this application, values of M and N can be configured by the network-side device by using radio resource control (RRC) signaling, or configured by the network-side device by using RRC signaling, and selected, determined, or modified by using a medium access control control element (MAC-CE).

Optionally, in this embodiment of this application, the information about the target beams includes at least one of the following: target CSI measurement resource indicators are CSI reference signal resource indicators CRIs or system synchronization block resource indicators SSBRIs, and measurement values of target CSI measurement resources are layer 1 measurement values.

For example, the measurement values of the target CSI measurement resources are layer 1 measurement values.

For example, each of the target CSI measurement resource indicators corresponds to a measurement value of one CSI measurement resource. The measurement value may be used to determine communication quality of a beam associated with the target CSI measurement resource indicator.

In an example, the layer 1 measurement value may be layer 1 reference signal received power (L1-RSRP), that is, L1-RSRP, or a layer 1 signal to interference plus noise ratio (L1-SINR), that is, an L1-SINR.

For example, the target CSI measurement resource indicators may be used to provide auxiliary information for beam scheduling to the network-side device.

For example, the target CSI measurement resource indicators may include: CSI-RS resource indicators (CRIs), or SSB resource indicators (SSBRIs).

In this embodiment of this application, the predetermined condition refers to second beams whose measurement values are ranked top M among all the second beams. Optionally, for example, the terminal receives and measures a plurality of CSI-RS signals corresponding to resources indicated by a plurality of CSI-RS resource indicators configured by the network-side device. After receiving and measuring the plurality of CSI-RS signals corresponding to the resources indicated by the plurality of CSI-RS resource indicators configured by the network-side device, the terminal selects, from the plurality of CSI-RS signals, CSI-RS signals whose measurement values are ranked top M, and then obtains corresponding M CSI-RS resource indicators. Then the terminal selects M CSI-RS resource indicators, where the M CSI-RS resource indicators are sorted based on measurement values corresponding to the CSI-RS signals, and there is a one-to-one correspondence between a measurement value of each CSI-RS signal and a corresponding resource indicator of the CSI-RS signal in an arrangement position, where a resource indicator of a CSI-RS signal with a largest measurement value is arranged in a first position, and resource indicators of the selected M CSI-RS signals and corresponding measurement values thereof are used as information about the second beams. Similarly, for example, the terminal receives and measures a plurality of SSB signals corresponding to resources indicated by a plurality of SSB resource indicators configured by the network-side device. After receiving and measuring the plurality of SSB signals corresponding to the resources indicated by the plurality of SSB resource indicators configured by the network-side device, the terminal selects, from the plurality of SSB signals, SSB signals whose measurement values are ranked top M, and then obtains corresponding M SSB resource indicators. Then the terminal selects M SSB resource indicators, where the M SSB resource indicators are sorted based on measurement values corresponding to the SSB signals, and there is a one-to-one correspondence between a measurement value of each SSB signal and a corresponding resource indicator of the SSB signal in an arrangement position, where a resource indicator of an SSB signal with a largest measurement value is arranged in a first position, and resource indicators of the selected M SSB signals and corresponding measurement values thereof are used as information about the second beams.

Example 1: If M is equal to 4, in a case that the terminal receives 10 CSI-RS signals, the terminal measures and calculates received power or signal to interference plus noise ratios of the 10 CSI-RS signals, and sorts the 10 CSI-RS signals based on layer 1 reference signal received power or layer 1 signal to interference plus noise ratios, where resource indicators and measurement values corresponding to top four CSI-RS signals constitute information about the second beams.

In this embodiment of this application, the target channel may include a PUCCH or a PUSCH.

It may be understood that after receiving a CSI measurement resource configured by the network-side device, the terminal receives and measures a CSI-RS signal or an SSB signal (hereinafter referred to as a reference signal) on the CSI measurement resource to obtain a measurement value of the reference signal, and then determines, based on the measurement value, CSI-related parameters or beam information required in a communication process of the network-side device as content of the CSI report, and then reports the CSI report to the network-side device through the PUCCH or PUSCH, and the network-side device performs communication with the terminal based on a communication mode indicated in the CSI report. In the process of reporting the CSI report to the network-side device through the PUCCH or PUSCH, it is necessary to perform UCI mapping according to the mapping rule preset by the network-side device, and then reporting of the CSI report can be completed.

In this embodiment of this application, different mapping rules may be used to perform UCI mapping based on different CSI reports. Optionally, the UCI mapping rule depends on the information in the CSI report (for example, the information for indicating the beam reporting type in the CSI report, and the information about the target beams in the CSI report). If the information in the CSI report is different, the mapping rule for UCI mapping is also different correspondingly.

The terminal provided in this embodiment of this application maps the X CSI reports (the CSI reports include the information for indicating the beam reporting type and/or the information about the target beams) according to the preset mapping rule matching the beam reporting type, and feeds back the X CSI reports to the network-side device through the target channel (for example, the physical uplink control channel (PUCCH) or the physical uplink shared channel (PUSCH)), so that the network-side device performs communication and transmission with the terminal based on a mapping result reported by the terminal. In the foregoing process, because the target beams include the N pairs of first beams that can be simultaneously received by the terminal, (N is a positive integer greater than 1), and/or the M second beams whose measurement values satisfy the predetermined condition (M is a positive integer), in a case that the beam reporting type is group-based beam reporting, the method provided in this embodiment of this application can enable the terminal to simultaneously report a plurality of pairs of beams, instead of reporting only one pair of beams.

Optionally, in this embodiment of this application, when the beam reporting type is configured by the network-side device for the terminal, the beam reporting type may be modified by the network-side device by using a MAC-CE.

In this way, modifying the beam reporting type by using the MAC-CE can avoid problems of high RRC signaling overheads and inflexible switching in this manner because a terminal can implement sTRP-mTRP switching only after a "group-based beam reporting" field in a CSI report configuration is reconfigured by using RRC signaling in the related art.

Optionally, in this embodiment of this application, in a case that the CSI report includes the target CSI measurement resource indicators, the channel state information CSI report mapping method provided in this embodiment of this application further includes the following step 202.

Step 202: The terminal encodes the target CSI measurement resource indicators based on a preset encoding mode.

For example, the target CSI measurement resource indicators include all target CSI measurement resource indicators or a part of target CSI measurement resource indicators.

For example, the CSI measurement resource indicators may be CRIs or SSBRIs.

The preset encoding mode includes at least one of the following:

- the terminal performs encoding based on a quantity of channel measurement resources (CMR) configured in a CSI measurement resource setting;
- the terminal performs encoding based on a quantity of CMRs configured in a CSI measurement resource set;
- the terminal performs encoding based on a quantity of CMRs configured in a CSI measurement resource subset in the CSI measurement resource set; and
- the terminal performs joint encoding based on CMR resources.

For example, in a case that the preset encoding mode is that the terminal performs encoding based on the quantity of CMRs configured in the CSI measurement resource setting, if the CSI measurement resource indicators are CRIs, and a total quantity of CMRs configured in the CSI measurement resource setting is K, a resource occupied by one CRI is $\lceil \log_2 K \rceil$ bits.

For example, in a case that the terminal performs encoding based on the quantity of CMRs configured in the CSI measurement resource set, if the CSI measurement resource indicators are CRIs, and Z CSI measurement resource sets are configured in the CSI measurement resource setting, where each CSI measurement resource set includes $K_i$ channel measurement resources, and different CSI measurement resource sets correspond to different CORESET-PoolIndexes, the following manner 1 or manner 2 may be used to determine a correspondence between a currently reported target CSI measurement resource indicator and a CSI measurement resource set.

Manner 1: The terminal extends a field of the target CSI measurement resource indicator by $\log_2 Z$ bits to indicate a correspondence between a currently reported CRI or SSBRI and the CSI measurement resource set. Fields of the target CSI measurement resource indicators may be fields of a part of CSI measurement resource indicators in the target CSI measurement resource indicators, or may be fields of all CSI measurement resource indicators in the target CSI measurement resource indicators.

For example, in a case that the target CSI measurement resource indicator is a CRI, the terminal extends a field of the CRI by $\lceil \log_2 Z \rceil$ bits to add an identifier of a CMR set to which the CRI belongs. In this case, a resource that one CRI needs to occupy, that is, a quantity of corresponding UCI bits, is $\lceil \log_2 K_i \rceil + \lceil \log_2 Z \rceil$.

Manner 2: Add a field before a first CSI measurement resource indicator, where the field is used to indicate a CSI measurement resource set corresponding to the first CSI measurement resource indicator, and remaining CSI measurement resource indicators are mapped and arranged according to the preset mapping rule, and determine a correspondence between the first CSI measurement resource indicator and the CSI measurement resource set, where the first CSI measurement resource indicator is an identifier of a CMR with a largest L1-RSRP or L1-SINR value.

Regarding the foregoing manner 2, the correspondence between the target CSI measurement resource indicator and the CSI measurement resource set may be indicated in the manner in the following example 1.

Figure 3:
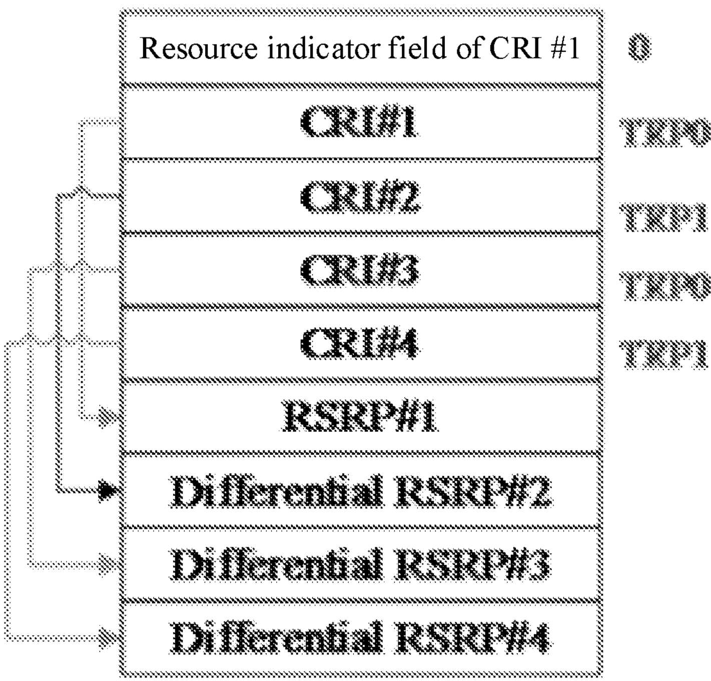
FIG. 3 is a first schematic diagram of a mapping process of a channel state information CSI report mapping method according to an embodiment of this application.

Example 1: When the quantity of CSI measurement resource sets configured by the network-side device in the CSI measurement resource setting is Z=2, and the beam report quantity is 4, and the CSI measurement resource indicators are CRIs (that is, the CSI measurement resource indicators include CRI #1, CRI #2, CRI #3, and CRI #4), the terminal may determine a correspondence between the target CSI measurement resource indicators and CSI measurement resource sets in the manner shown in FIG. 3. When two CRIs are mapped to UCI as a group, and the two CRIs correspond to different CSI measurement resource sets, if a resource indicator field of newly added CRI #1 is 0, it indicates that a CMR corresponding to CRI #1 corresponds to CSI measurement resource set 0, and a CMR corresponding to CRI #2 paired with CRI #1 corresponds to CSI measurement resource set 1. Remaining CRI groups are arranged based on a correspondence similar to a correspondence between CRIs in the first CRI group and TRPs. For example, a CMR corresponding to CRI #3 corresponds to CSI measurement resource set 0, and a CMR corresponding to CRI #4 corresponds to CSI measurement resource set 1.

For example, in a case that the foregoing preset encoding mode is that the terminal performs encoding based on the quantity of CMRs configured in the CSI measurement resource subset in the CSI measurement resource set, the terminal may configure one CSI measurement resource set in one CSI measurement resource configuration, and may divide CMRs in the CSI measurement resource set into P CSI measurement resource subsets, where each CSI measurement resource subset is associated with a different control resource set pool identifier (CORESETPool Index).

Further, the terminal may determine a correspondence between the currently reported target CSI measurement resource indicator and a CSI measurement resource subset in the following manner 3 or manner 4.

Manner 3: Extend the field of the target CSI measurement resource indicator by $\log_2 P$ bits to indicate the correspondence between the currently reported target CSI measurement resource indicator and the CSI measurement resource subset.

Manner 4: Add a field to the UCI, where the field is used to indicate a CSI measurement resource subset corresponding to a first CSI measurement resource indicator, and the remaining CSI measurement resource indicators are mapped and arranged according to the preset mapping rule of the network, and determine a correspondence between the first CSI measurement resource indicator and the CSI measurement resource subset, where the first CSI measurement resource indicator is an identifier of a CMR with a largest L1-RSRP or L1-SINR value.

For example, in a case that the preset encoding mode is that the terminal performs joint encoding based on CMR resources, all CSI measurement resource indicators are jointly encoded and mapped based on the quantity of CMRs, that is, one CSI measurement resource indicator corresponds to one or more CMRs, and each of the CMRs is associated with different CORESETPoolIndexes.

Further, the terminal may determine the correspondence between the currently reported target CSI measurement resource indicator and the CSI measurement resource subset in the following manner 5.

Manner 5: The network-side device configures all CMRs in pairs in advance to generate L CMR resource pairs, where L is a positive integer. Different CMRs in different CMR resource pairs correspond to different CORESETPoolIndexes. In this case, the target CSI measurement resource indicators are jointly encoded identifiers of the CMR resource pairs.

Example 2: In a case that the target CSI measurement resource indicators are CRIs, assuming that the total quantity of CMRs is 4 and that a quantity of CORESETPoolIndexes is 2, values of CORESETPoolIndexes are 0 or 1, and every two CMRs are associated with one CORESETPoolIndex. In this case, the network-side device may preconfigure the CMRs in pairs, as shown in Table 3, and the terminal needs to report only one CRI when performing reporting.

TABLE 3

| | | |
|---|---|---|
| CORESETPoolIndex #0 | CRI 1 | (CMR 1, CMR 3) |
| | CRI 2 | (CMR 1, CMR 4) |
| CORESETPoolIndex #1 | CRI 3 | (CMR 2, CMR 3) |
| | CRI 4 | (CMR 2, CMR 4) |

For example, in a case that the foregoing target CSI measurement resource indicators are a part of measurement resource indicators, all the foregoing CSI measurement resource indicators may include a plurality of parts of measurement resource indicators. Correspondingly, a preset encoding mode of each part of measurement resource indicators may be different.

In an example, the preset encoding modes of the target CSI measurement resource indicators may include the following two modes: the terminal performs encoding based on the quantity of CMRs configured in the CSI measurement resource setting; and the terminal performs encoding based on the quantity of CMRs configured in the CSI measurement resource set. For example, if the target CSI measurement resource indicators include two parts of CSI measurement resource indicators, an encoding mode of a first part of CSI measurement resource indicators is: the terminal performs encoding based on the quantity of CMRs configured in the CSI measurement resource setting, and an encoding mode of a second part of CSI measurement resource indicators is: the terminal performs encoding based on the quantity of CMRs configured in the CSI measurement resource set.

In an example, the preset encoding modes of the target CSI measurement resource indicators may include the following two modes: the terminal performs encoding based on the quantity of CMRs configured in the CSI measurement resource set; and the terminal performs encoding based on the quantity of CMRs configured in the CSI measurement resource subset in the CSI measurement resource set. For example, if the target CSI measurement resource indicators include two parts of CSI measurement resource indicators, an encoding mode of a first part of CSI measurement resource indicators is: the terminal performs encoding based on the quantity of CMRs in the CSI measurement resource set, and an encoding mode of a second part of CSI measurement resource indicators is: the terminal performs encoding based on the quantity of CMRs configured in the CSI measurement resource subset in the CSI measurement resource set.

In this way, in the encoding mode of the foregoing target CSI measurement resource indicators (such as CRIs or SSBRIs), it is possible to avoid a problem that the network-side device cannot identify which TRP measurement resources having a same CSI measurement resource indicator in the CSI report come from if a plurality of CSI measurement resource sets are configured in a potential multi-TRP CSI framework to perform a multi-TRP CSI measurement and the CSI measurement resource indicators are encoded and mapped based on a resource quantity of CSI measurement resources in the measurement resource set because the CSI measurement resource indicators in the current CSI report are encoded and mapped based on a quantity of CSI measurement resources in a channel measurement resource set (for example, a CMR set).

Optionally, in this embodiment of this application, in a case that the beam reporting type is configured by the network-side device, or determined by the terminal according to the preset rule of the network-side device,

- if the beam reporting type is group-based beam reporting, the terminal selects to report information about the N pairs of first beams that can be simultaneously received by the terminal, where target CSI measurement resource indicators in information about each pair of first beams correspond to different CSI measurement resources;
- if the beam reporting type is non-group-based beam reporting, the terminal selects to report information about the M second beams whose measurement values satisfy the predetermined condition; or
- if the beam reporting type includes group-based and non-group-based hybrid beam reporting, the terminal selects to report information about Q pairs of first beams and information about W second beams.

For example, Q is less than or equal to N, W is less than or equal to M, Q and W can be configured by the network-side device or set according to a preset rule, and Q and W are positive integers.

For example, the CSI measurement resources include any one of the following: a CSI measurement resource setting, a CSI measurement resource set, and a CSI measurement resource sub set.

For example, the foregoing preset rule may refer to the preset rule described above, or the terminal may first determine, based on an actual measurement situation, a ratio of Q to W from a ratio set preset by the network-side device, and then determine values of Q and W with reference to a maximum beam report quantity Y configured by the network-side device or used by default.

For example, the ratio set preset by the network-side device includes three ratios 2:1, 1:1, and 1:2, and the three ratios correspond to three terminal measurement states respectively. When a sum of layer 1 measurement values of beams that can be simultaneously received is greater than a largest layer 1 measurement value of beams that cannot be simultaneously received, the terminal selects Q:W=2:1; when a sum of layer 1 measurement values of beams that can be simultaneously received is equal to a largest layer 1 measurement value of beams that cannot be simultaneously received, the terminal selects Q:W=1:1; or when a sum of layer 1 measurement values of beams that can be simultaneously received is less than a largest layer 1 measurement value of beams that cannot be simultaneously received, the terminal selects Q:W=1:2. After determining the ratio of Q to W, the terminal can determine specific values of Q and W based on the maximum beam report quantity Y configured by the network-side device or used by default.

For example, if the beam reporting type is group-based beam reporting, the terminal selects and determines to report the information about the N pairs of first beams that can be simultaneously received by the terminal, where CRIs/SSBRIs in each pair of first beams correspond to different CSI measurement resource settings, or CSI measurement resource sets, or CSI measurement resource subsets.

For example, if the beam reporting type is non-group-based beam reporting, the terminal selects and determines to report the information about the M second beams whose layer 1 measurement values satisfy the predetermined condition.

For example, if the beam reporting type includes group-based and non-group-based hybrid beam reporting, the terminal selects and determines to report the information about N pairs of first beams that can be simultaneously received and the information about the M second beams whose layer 1 measurement values satisfy the predetermined condition.

Optionally, in this embodiment of this application, in a case that the beam reporting type is determined by the terminal according to the preset rule of the network-side device, the beam reporting type can be indicated in either of the following manners:

- the beam reporting type is indicated by a target field in the CSI report; and
- the beam reporting type is indicated based on a value relationship between a measurement value of a CSI measurement resource and a target measurement threshold in the CSI report, where
- the target measurement threshold is configured by the network-side device, or preset by the network-side device and the terminal.

For example, when the beam reporting type is indicated by the target field in the CSI report, the beam reporting type may be indicated in the following manner a and manner b:

Manner a: The terminal extends the field of the target CSI measurement resource indicator by two bits to indicate that the corresponding beam reporting type is group-based beam reporting, non-group-based beam reporting, or group-based and non-group-based hybrid beam reporting.

Figure 4:
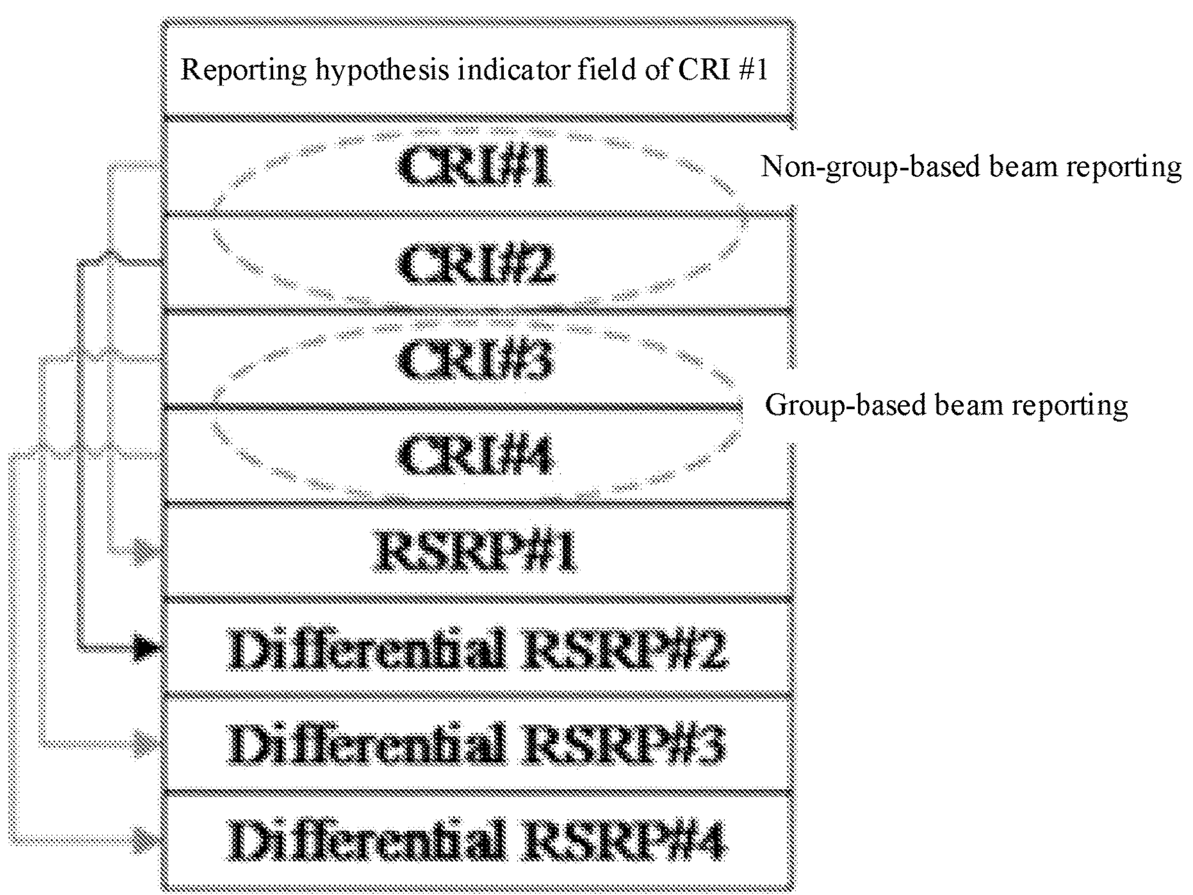
FIG. 4 is a second schematic diagram of a mapping process of a channel state information CSI report mapping method according to an embodiment of this application.
Figure 4:
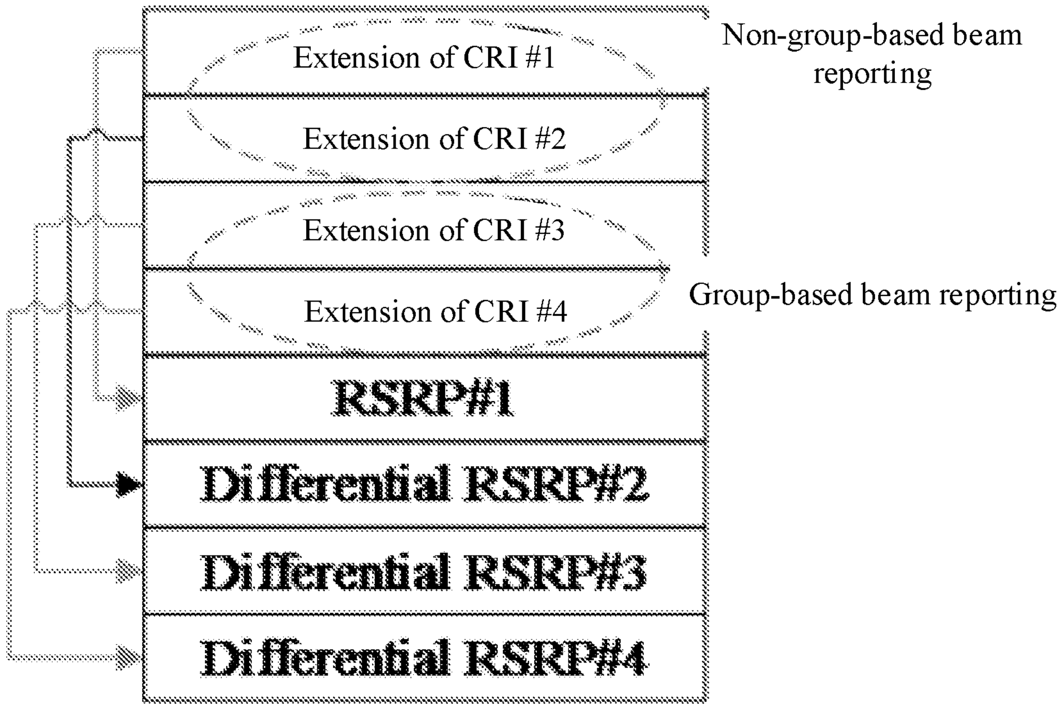

Example 3: The beam reporting type is group-based and non-group-based hybrid beam reporting, measurement values are L1-RSRP values, and the target CSI measurement resource indicators are CRI #1, CRI #2, CRI #3, and CRI #4. In this case, as shown in (a) in FIG. 4, the terminal extends a CRI field in which each CSI measurement resource indicator in the target CSI measurement resource indicators is located, by two bits to indicate a beam reporting type corresponding to the CSI measurement resource indicator, where 1 refers to group-based beam reporting, 0 refers to non-group-based beam reporting, and 2 refers to group-based and non-group-based hybrid beam reporting. In this case, the network-side device can correctly obtain all beam reporting types of the first beams and the beam reporting types of the second beams by reading CRI fields.

Manner b: The terminal adds a 1-bit field to fields of the target CSI measurement resource indicators to indicate the beam reporting type corresponding to the first CSI measurement resource indicator (for example, a CRI), so that the network-side device can distinguish between target CSI measurement resource indicators corresponding to different beam reporting types and layer 1 measurement values corresponding to the target CSI measurement resource indicators.

Example 4: As shown in (b) in FIG. 4, the beam reporting type is group-based and non-group-based hybrid beam reporting, measurement values are L1-RSRP values, and the target CSI measurement resource indicators are CRI #1, CRI #2, CRI #3, and CRI #4. In this case, the terminal can arrange, based on L1-RSRP values, first beams whose beam reporting type is group-based beam reporting and second beams whose beam reporting type is non-group-based beam reporting. Because a largest value of non-group-based reported L1-RSRP is greater than or equal to a largest value of group-based reported L1-RSRP, the second beams, that is, CRI #1 and CRI #2, are preferentially arranged. To facilitate the network-side device to know the beam reporting types of the first beams and the second beams, a 1-bit indicator field (that is, the foregoing target field) can be added in a start position of the UCI mapping (as shown in (a) in FIG. 4), where 1 refers to group-based beam reporting, and 0 refers to non-group-based beam reporting. In this field, 1 or 0 is used to indicate the beam reporting type of CRI #1, and the network-side device can correctly obtain all beam information based on the indicator field and quantities of the first beams and the second beams. It should be noted that when CRI #1 is a common value selected under two reporting hypotheses, the information about the first beams reported under the group-based reporting hypothesis type is arranged preferentially.

For example, when the beam reporting type is indicated based on the value relationship between the measurement value of the CSI measurement resource and the target measurement threshold in the CSI report, the beam reporting type may be indicated in the following manner c.

Manner c: The network-side device presets the target measurement threshold for the measurement value. The measurement value may be a layer 1 measurement value, and the target measurement threshold may be a differential threshold of the layer 1 measurement value.

In an example, when differences between measurement values of all beams received by the terminal (such as layer 1 measurement values of CRIs or layer 1 measurement values of SSBRIs) and the largest measurement value are all greater than or equal to the target measurement threshold, UCI mapping is performed on content in the CSI report according to the group-based beam reporting. Correspondingly, after the network-side device receives the measurement values of the beams and calculates differences between the measurement values and the largest measurement value, if all the differences are greater than or equal to the target measurement threshold, it can be considered that the beam information is measured and reported according to the group-based beam reporting.

In another example, when differences between measurement values of all beams received by the terminal (such as layer 1 measurement values of CRIs or layer 1 measurement values of SSBRIs) and the largest measurement value are all less than the target measurement threshold, UCI mapping is performed on content in the CSI report according to the non-group-based beam reporting. Correspondingly, after the network-side device receives the measurement values of the beams and calculates differences between the measurement values and the largest measurement value, if all the differences are less than the target measurement threshold, it can be considered that the beam information is measured and reported according to the non-group-based beam reporting.

Further, in the foregoing manner c, if the beam information reported by the terminal needs to be reported in a form of beam pairs, and differences between measurement values of first beams in all beam pairs (such as layer 1 measurement values of CRIs or layer 1 measurement values of SSBRIs) and measurement values of second beams in the beam pairs are all set to be greater than or equal to the target measurement threshold. In this case, UCI mapping is performed on the content in the CSI report according to the group-based beam reporting. Conversely, the terminal can set all differences between measurement values of first beams in all beam pairs (such as layer 1 measurement values of CRIs or layer 1 measurement values of SSBRIs) and measurement values of second beams in the beam pairs to be less than the target measurement threshold. In this case, UCI mapping is performed on the content in the CSI report according to the non-group-based beam reporting.

Correspondingly, after receiving the beam pairs, the network-side device calculates a difference between the measurement value of the first beam and the measurement value of the second beam in each beam pair. If the difference is greater than or equal to the target measurement threshold, it can be considered that beam information is reported according to group-based beam reporting. Conversely, if the difference is less than the target measurement threshold, it can be considered that beam information is reported according to non-group-based beam reporting.

Further, in a case that the beam reporting type that the terminal needs to set is group-based and non-group-based hybrid beam reporting, if differences between measurement values of a part of all beams (for example, layer 1 measurement values of CRIs or layer 1 measurement values of SSBRIs) and the largest measurement value are greater than or equal to the target measurement threshold (indicating that the beam reporting type is group-based beam reporting), and differences between measurement values of remaining beams (such as layer 1 measurement values of CRIs or layer 1 measurement values of SSBRIs) and the largest measurement value are less than the target measurement threshold (indicating that the beam reporting type is non-group-based beam reporting), UCI mapping is performed on the content in the CSI report reported by the terminal according to group-based and non-group-based hybrid beam reporting. Similarly, the terminal receives and measures all beams, and differences between measurement values of first beams and measurement values of second beams in some beam pairs are greater than or equal to the target measurement threshold (indicating that the beam reporting type is group-based beam reporting), and differences between measurement values of first beams and measurement values of second beams in remaining beam pairs are less than the target measurement threshold (indicating that the beam reporting type is non-group-based beam reporting), UCI mapping is performed on the content in the CSI report reported by the terminal according to group-based and non-group-based beam reporting.

Optionally, in this embodiment of this application, in a case that the beam reporting type is configured by the network-side device for the terminal, or determined by the terminal according to the preset rule of the network-side device, in a case that the beam reporting type is group-based beam reporting, the preset mapping rule includes either of the following:

a first rule; and a second rule, where the first rule includes: a first CSI measurement resource indicator is arranged in a first position, and CSI measurement resource indicators of remaining beams are sequentially arranged in a form of beam pairs, where the first CSI measurement resource indicator is a measurement resource indicator corresponding to a beam whose layer 1 measurement value is largest among the N pairs of first beams; and the second rule includes: if the first rule is satisfied, the layer 1 measurement value corresponding to the first CSI measurement resource indicator is mapped, and layer 1 measurement values of the remaining beams are mapped based on differences between the layer 1 measurement value corresponding to the first CSI measurement resource indicator and the layer 1 measurement values of the remaining beams.

For example, in a case that the preset mapping rule is the first rule, an arrangement manner of the CSI measurement resource indicators is shown in example 5.

Example 5: When the beam reporting type is group-based beam reporting, the CSI measurement resource indicators include CRI #1, CRI #2, CRI #3, and CRI #4, and the terminal reports the quantity N=2 of beam pairs that can be simultaneously received by the terminal. When each beam pair includes two CRIs and corresponding layer 1 measurement values thereof, CRI #1 and CRI #2 constitute a pair of beams that can be simultaneously received and are arranged in a first position, and CRI #3 and CRI #4 constitute a pair of beams that can be simultaneously received and are arranged in sequence. CRI #1 is a measurement resource indicator corresponding to a beam whose layer 1 measurement value is largest among the foregoing four beams.

For example, in a case that the preset mapping rule is the second rule, an arrangement manner of layer 1 measurement values corresponding to the CSI measurement resource indicators is shown in example 6.

Example 6: When the beam reporting type is group-based beam reporting, the CSI measurement resource indicators include CRI #1, CRI #2, CRI #3, and CRI #4, and the terminal reports the quantity N=2 of beam pairs that can be simultaneously received by the terminal. In addition, in a case that a quantity of CMRs included in each beam pair is 2, a first CRI or SSBRI corresponds to a CRI (that is, the first CSI measurement resource) with largest L1-RSRP (that is, a layer 1 measurement value), and the L1-RSRP is directly quantized and then mapped, and is arranged in a first position of a layer 1 measurement value sequence; and remaining L1-RSRP values are differentiated from the largest L1-RSRP value and then quantized and mapped, and a specific arrangement order corresponds to an arrangement order of their CRIs.

Figure 5:
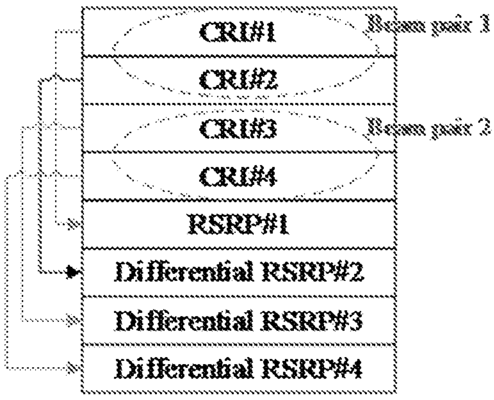
FIG. 5 is a third schematic diagram of a mapping process of a channel state information CSI report mapping method according to an embodiment of this application.

The UCI mapping rule for CSI reporting is shown in FIG. 5. When the network-side device configures beam reporting as group-based beam reporting, the quantity N=2 of beam pairs that can be simultaneously received is reported, each beam pair includes two CRIs, and a quantity of CMRs of layer 1 measurement values corresponding to the two CRIs is 2. CRI #1 and CRI #2 are a pair of beams that can be simultaneously received, and an L1-RSRP value (that is, a layer 1 measurement value) corresponding to CRI #1 is largest among the four CRIs. Therefore, this value is arranged on top of the measurement values, and can be directly quantized and mapped. CRI #3 and CRI #4 are another pair of beams that can be simultaneously received, and their L1-RSRP value differences are differentially reported in descending order.

It should be noted that, in the foregoing example 4, when the terminal encodes the target CSI measurement resource indicators in a manner of joint encoding and mapping, the terminal needs to report only two CSI measurement resource indicators, and the layer 1 measurement values can be reported as 2 or 4.

Optionally, in this embodiment of this application, in a case that the beam reporting type is group-based and non-group-based hybrid beam reporting, the preset mapping rule includes either of the following:

a third rule; and a fourth rule, where the third rule includes: a second CSI measurement resource indicator is arranged in a first position, and an arrangement order of the N pairs of first beams and the M second beams is determined based on a beam reporting type of a beam corresponding to the second CSI measurement resource indicator, where the second CSI measurement resource indicator is a CSI measurement resource indicator corresponding to a beam whose layer 1 measurement value is largest among the N pairs of first beams and the M second beams; and the fourth rule includes: if the third rule is satisfied, the layer 1 measurement value corresponding to the second CSI measurement resource indicator is mapped, and layer 1 measurement values of remaining beams are mapped based on differences between the layer 1 measurement value corresponding to the second CSI measurement resource indicator and the layer 1 measurement values of the remaining beams.

For example, in a case that the preset mapping rule is the third rule, an arrangement manner of the CSI measurement resource indicators is shown in example 7.

Example 7: When the beam reporting type is non-group-based and group-based hybrid beam reporting, the CSI measurement resource indicators include CRI #1, CRI #2, CRI #3, and CRI #4. Assuming that the terminal supports reporting of one pair of beams that can be simultaneously received (that is, N=1) and two beams whose L1-RSRPs (that is, layer 1 measurement values) are highest (each beam is associated with one CORESETPoolIndex, and M=2), if a beam reporting type of a CRI (a CSI measurement resource indicator) corresponding to RSRP #1 (that is, the largest layer 1 measurement value) is non-group-based beam reporting, the terminal arranges CRI #1 corresponding to RSRP #1 and CRI #2 corresponding to RSRP #2 whose measurement value is the second largest on top of all measurement resource indicators in the CSI report, and CRI #3 and CRI #4 are paired and arranged after CRI #2 in sequence. Conversely, the terminal needs to place the reported CRI #3 and CRI #4 on top of all measurement resource indicators based on the two beam reporting types respectively, and place CRI #1 and CRI #2 after CRI #4.

For example, when the preset mapping rule is the fourth rule, an arrangement manner of layer 1 measurement values corresponding to the target CSI measurement resource indicators is as follows: the largest layer 1 measurement value (that is, an L1-RSRP value or an L1-SINR value), that is, RSRP #1, is directly quantized and mapped, and is arranged in a first position in a layer 1 measurement value sequence; and remaining layer 1 measurement values are differentiated from the largest value of the layer 1 measurement values and then quantized and mapped, and a specific arrangement order corresponds to the arrangement order of corresponding CRIs or SSBRIs.

Figure 6:
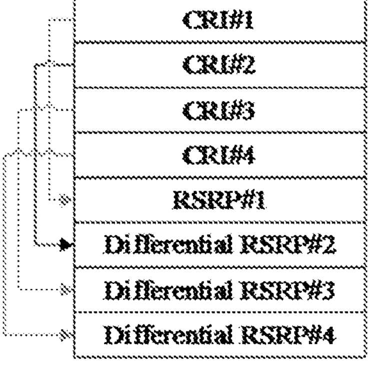
FIG. 6 is a fourth schematic diagram of a mapping process of a channel state information CSI report mapping method according to an embodiment of this application.

Example 8: When the network-side device configures beam reporting as non-group-based beam reporting and supports reporting of four beams, the UCI mapping rule for CSI reporting is shown in FIG. 6. CRI #1, CRI #2, CRI #3, and CRI #4 are four CMR identifiers with largest L1-RSRP values (measurement values), and the L1-RSRP value corresponding to CRI #1 is the largest among the four CRIs. Therefore, this value is arranged on top of the measurement values, and may be directly quantized and mapped. L1-RSRPs corresponding to CRI #2, CRI #3, and CRI #4 are differentially reported.

It should be noted that when the CRIs are jointly encoded and mapped, only two CRIs need to be reported, but two or four L1-RSRP values need to be reported.

Optionally, in this embodiment of this application, the terminal adds a first indicator field before an indicator field corresponding to a third CSI measurement resource indicator, or the terminal extends a second indicator field corresponding to a third CSI measurement resource indicator, where the first indicator field and the second indicator field are used to indicate the beam reporting type.

For example, the third CSI measurement resource indicator is either of the following: the second CSI measurement resource indicator; and all CSI measurement resource indicators in the N pairs of first beams and the M second beams.

In an example, in a case that the terminal adds the first indicator field before the indicator field corresponding to the third CSI measurement resource indicator, the terminal may add the first indicator field before each CSI measurement resource indicator, that is, add the first indicator field before all CSI measurement resource indicators in the N pairs of first beams and the M second beams; or the terminal may add the first indicator field before only the first CSI measurement resource indicator, that is, the terminal adds the first indicator field only before the second CSI measurement resource indicator. The first indicator field may be a field occupying a 1-bit resource.

In another example, in a case that the terminal extends the second indicator field corresponding to the third CSI measurement resource indicator, the terminal may extend the second indicator field in each CSI measurement resource, that is, extend the second indicator field in all CSI measurement resource indicators in the N pairs of first beams and the M second beams; or the terminal may extend the second indicator field in only the first CSI measurement resource indicator, that is, the terminal adds the second indicator field only before the second CSI measurement resource indicator. The second indicator field may be a field occupying a 1-bit resource.

In this way, the terminal indicates the beam reporting type by adding an indicator field to a CSI measurement resource indicator, so that the network-side device can obtain the beam reporting type through parsing after receiving the CSI report including the CSI measurement resource indicator, and parse the CSI report according to a mapping rule corresponding to the beam reporting type.

Optionally, in this embodiment of this application, in a case that the beam reporting type is determined by the terminal according to the preset rule of the network-side device, and that the beam reporting type is group-based beam reporting, the preset mapping rule includes:

the terminal arranges, in a first position, a first CSI measurement resource indicator corresponding to a beam whose layer 1 measurement value is largest among the N pairs of first beams, and sequentially arranges CSI measurement resource indicators of remaining first beam pairs in a form of beam pairs, where the remaining first beam pairs include other beam pairs than a beam pair including the beam whose layer 1 measurement value is the largest among the N pairs of first beams.

For example, first beam pairs generated by the remaining first beam pairs satisfy a first relationship, and the first relationship is a fixed value relationship between layer 1 measurement values in the beam pairs.

For example, the foregoing fixed value relationship may be configured in advance or set by default by the network-side device and the terminal.

For example, the first beam pair may include one beam pair or a plurality of beam pairs. For example, when N is 6, the terminal pairs the six pairs of beams, and there are three beam pairs in total. The first beam in the first beam pair corresponds to the largest layer 1 measurement value, and the remaining beam pairs are the remaining first beam pairs, and there are two beam pairs in total. Further, in either of the two beam pairs, the measurement value of the first beam is greater than the measurement value of the second beam. To be specific, that the measurement value of the first beam is greater than the measurement value of the second beam means that there is a fixed value relationship.

Example 9: It is assumed that the CSI measurement resource indicators include CRI #1, CRI #2, CRI #3, CRI #4, and that layer 1 measurement values corresponding to the four CRIs. CRI #1 and CRI #2 constitute a beam pair that can be simultaneously received, and CRI #3 and CRI #4 constitute a beam pair that can be simultaneously received. CRI #1 is a CMR identifier corresponding to the largest L1-RSRP value, and an L1-RSRP value corresponding to CRI #3 is not less than an L1-RSRP value corresponding to CRI #4 (that is, the foregoing fixed value relationship).

It may be understood that, in example 5 to example 9, CRI #1, CRI #2, CRI #3, and CRI #4 may alternatively be SSBRI #1, SSBRI #2, SSBRI #3, and SSBRI #4. The L1-RSRP value may alternatively be an L1-SINR value.

Further, the arrangement order of the layer 1 measurement values corresponds to the arrangement order of the CSI measurement resource indicators, where the largest value of the layer 1 measurement values is directly quantized and mapped, and the remaining measurement values are differentiated from the largest value and then quantized and mapped. In this way, the terminal can reduce resource occupation overheads.

Further, after the terminal reports the information about the first beams according to the UCI mapping rule satisfying a first condition, and the network-side device receives the information about the first beams according to the UCI mapping rule satisfying the first condition, it can be known that the received beam information is reported according to group-based beam reporting, and can be used for mTRP transmission.

Optionally, in this embodiment of this application, in a case that the beam reporting type is determined by the terminal according to the preset rule of the network-side device, and that the beam reporting type is non-group-based beam reporting, the preset mapping rule includes:

the terminal arranges, in a first position, a second CSI measurement resource indicator corresponding to a beam whose layer 1 measurement value is largest among the M second beams, and sequentially arranges CSI measurement resource indicators of remaining second beams, where the remaining second beams are other beams than the beam whose layer 1 measurement value is the largest among the M second beams; and the terminal generates second beam pairs by pairing the second beams, where the second beam pairs satisfy a second condition, and the second condition is: among the second beam pairs, there is at least one pair with a fixed value relationship between layer 1 measurement values corresponding to CSI measurement resource indicators.

For example, for the predetermined condition, refer to the foregoing description. Details are not described herein again.

For example, the CSI measurement resource indicator of the first beam in the first beam pair is a CMR identifier with the largest layer 1 measurement value, the largest value of the layer 1 measurement values is directly mapped, and the remaining layer 1 measurement values are differentiated from the largest layer 1 measurement value and then quantized and mapped.

In an example, in the information about the second beams, after the second beam pairs are generated by pairing the second beams, a first beam pair in the second beam pairs includes: the second CSI measurement resource indicator and a CSI measurement resource indicator in a second position after the CSI measurement resource indicators are sorted, and among the CSI measurement resource indicators corresponding to the second beams, there is at least one group of CSI measurement resource indicators satisfying that a layer 1 measurement value corresponding to a first CSI measurement resource indicator in the group is less than a layer 1 measurement value corresponding to a second CSI measurement resource indicator in the group. Further, a mapping sequence of all layer 1 measurement values corresponds to CSI measurement resource indicators of the layer 1 measurement values.

For example, the CSI measurement resource indicators in the second beam pairs may correspond to different CSI measurement resource settings, or CSI measurement resource sets, or CSI measurement resource subsets.

Further, after the terminal reports the information about the first beams according to the UCI mapping rule satisfying the second condition, and the network-side device receives the information about the first beams according to the UCI mapping rule satisfying the second condition, it can be known that the received beam information is reported according to non-group-based beam reporting, and can be used for sTRP transmission.

Optionally, in this embodiment of this application, in a case that the beam reporting type is determined by the terminal according to the preset rule of the network-side device, and that the beam reporting type is group-based and non-group-based hybrid beam reporting, the preset mapping rule includes:

the terminal generates T pairs of second beams by pairing the M second beams, and arranges the N pairs of first beams before the T pairs of second beams, where the N pairs of first beams and the T pairs of second beams satisfy a third condition, and the third condition includes:

layer 1 measurement values corresponding to CSI measurement resource indicators arranged in first positions in each of the N pairs of first beams are sorted in descending order, layer 1 measurement values corresponding to CSI measurement resource indicators corresponding to each pair of first beams are sorted in descending order, and the layer 1 measurement values corresponding to the CSI measurement resource indicators arranged in the first positions in each of the N pairs of first beams are non-differentially mapped; and layer 1 measurement values corresponding to CSI measurement resource indicators arranged in first positions in each of the T pairs of second beams are sorted in descending order, layer 1 measurement values corresponding to CSI measurement resource indicators corresponding to each pair of second beams are sorted in descending order, and the layer 1 measurement values corresponding to the CSI measurement resource indicators arranged in the first positions in each of the T pairs of second beams are non-differentially mapped.

For example, the third relationship is: the terminal sorts the N pairs of first beams in descending order based on layer 1 measurement values corresponding to CSI measurement resource indicators arranged in first positions in each pair of first beams, and sorts CSI measurement resource indicators corresponding to each pair of first beams in descending order based on layer 1 measurement values corresponding to the CSI measurement resource indicators, and the layer 1 measurement values corresponding to the CSI measurement resource indicators arranged in the first positions in each of the N pairs of first beams are non-differentially mapped; and then the terminal further sorts the T pairs of second beams in descending order based on layer 1 measurement values corresponding to CSI measurement resource indicators arranged in first positions in each pair of second beams, and sorts CSI measurement resource indicators corresponding to each pair of second beams in descending order based on layer 1 measurement values corresponding to the CSI measurement resource indicators, and the CSI measurement resource indicators arranged in the first positions in each of the T pairs of second beams are non-differentially mapped.

For example, two CSI measurement resource indicators in each of the N pairs of first beams and the T pairs of second beams may correspond to different CSI measurement resource settings, or CSI measurement resource sets, or CSI measurement resource subsets.

For example, the layer 1 measurement values corresponding to the CSI measurement resource indicators of the second beams in each of the N pairs of first beams and the T pairs of second beams may be non-differentially mapped, or the layer 1 measurement values corresponding to the CSI measurement resource indicators of the first beams are differentially mapped. Resource occupation overheads can be reduced by setting the layer 1 measurement value corresponding to the CSI measurement resource indicator of the second beam to a difference between the layer 1 measurement value corresponding to the CSI measurement resource indicator of the second beam and the layer 1 measurement value corresponding to the CSI measurement resource indicator of the first beam.

Further, after the terminal reports the information about the first beams and the information about the second beams according to the foregoing UCI mapping rule satisfying the third condition, and the network-side device receives the information about the first beams and the information about the second beams according to the UCI mapping rule satisfying the third condition, it can be known that the received beam information is reported according to group-based and non-group-based hybrid beam reporting.

Optionally, if inversion occurs (that is, at least one layer 1 measurement value corresponding to a first measurement resource indicator in a beam pair arranged in a rear position is greater than a layer 1 measurement value corresponding to a first measurement resource indicator of a beam pair arranged in a front position), it can be known that the received beam information is reported according to hybrid beam reporting, and a CRI or an SSBRI before the position in which the inversion occurs for the first time is group-based reported and can be used for mTRP transmission, while a CRI or an SSBRI after this position is non-group-based reported and can be used for sTRP transmission.

Figure 7:
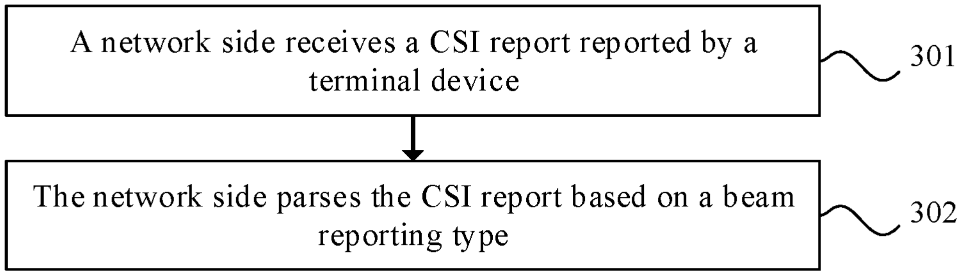
FIG. 7 is a second flowchart of a channel state information CSI report mapping method according to an embodiment of this application.

FIG. 7 is a schematic flowchart of a channel state information CSI report mapping method according to an embodiment of this application. As shown in FIG. 7, the method is applied to a network-side device, and the channel state information CSI report mapping method may include step 301 and step 302.

Step 301: A network-side device receives a CSI report reported by a terminal.

Step 302: The network-side device parses the CSI report based on a beam reporting type.

In this embodiment of this application, the CSI report includes at least one of the following: information for indicating the beam reporting type and information about target beams; the target beams include at least one of the following: N pairs of first beams that can be simultaneously received by the terminal, and M second beams whose measurement values satisfy a predetermined condition, where N is a positive integer greater than or equal to 1, and M is a positive integer; and the beam reporting type is configured by the network-side device for the terminal, or determined by the terminal according to a preset rule of the network-side device.

In this embodiment of this application, the beam reporting type includes at least one of the following: group-based beam reporting, non-group-based beam reporting, and group-based and non-group-based hybrid beam reporting.

In this embodiment of this application, the network-side device may parse the CSI report based on the beam reporting type after receiving the CSI report reported by the terminal. In the foregoing process, the network-side device may receive CSI reports provided by the terminal in a plurality of beam reporting manners, and flexibly perform parsing in a parsing manner corresponding to a corresponding preset mapping manner.

Optionally, in this embodiment of this application, before step 301, the channel state information CSI report mapping method provided in this embodiment of this application may further include the following step 303 or step 304.

Step 303: The network-side device configures the beam reporting type in a CSI report configuration.

Step 304: The network-side device configures the beam reporting type by presetting the preset rule for the terminal, where the preset rule corresponds to the beam reporting type.

Optionally, in this embodiment of this application, in a case that the network-side device does not configure the beam reporting type in the CSI report configuration, before step 302, the channel state information CSI report mapping method provided in this embodiment of this application may further include the following step 305.

Step 305: The network-side device determines the beam reporting type of the CSI report in a preset manner.

For example, the preset manner includes any one of the following:

querying the beam reporting type indicated by a target field;

querying a value relationship between a measurement value of a CSI measurement resource and a target measurement threshold in the CSI report, where the value relationship is used to indicate the beam reporting type; and querying whether the N pairs of first beams and/or the M second beams satisfy a first condition, a second condition, or a third condition.

Optionally, in this embodiment of this application, the first condition is: first beam pairs generated by remaining first beam pairs satisfy a first relationship, and the first relationship is a fixed value relationship between layer 1 measurement values in the remaining first beam pairs, where the remaining first beam pairs include other beam pairs than a beam pair including a beam whose layer 1 measurement value is largest among the N pairs of first beams;

the second condition is: among second beam pairs, there is at least one pair with a fixed value relationship between layer 1 measurement values corresponding to CSI measurement resource indicators, and among second beam pairs, there is at least one pair with a fixed value relationship between layer 1 measurement values corresponding to CSI measurement resource indicators, where the second beam pairs are beam pairs generated by the terminal by pairing the second beams; and the third condition includes:

the N pairs of first beams are arranged before T pairs of second beams;

layer 1 measurement values corresponding to CSI measurement resource indicators arranged in first positions in each of the N pairs of first beams are sorted in descending order, layer 1 measurement values corresponding to CSI measurement resource indicators corresponding to each pair of first beams are sorted in descending order, and the layer 1 measurement values corresponding to the CSI measurement resource indicators arranged in the first positions in each of the N pairs of first beams are non-differentially mapped; and layer 1 measurement values corresponding to CSI measurement resource indicators arranged in first positions in each of the T pairs of second beams are sorted in descending order, layer 1 measurement values corresponding to CSI measurement resource indicators corresponding to each pair of second beams are sorted in descending order, and the layer 1 measurement values corresponding to the CSI measurement resource indicators arranged in the first positions in each of the T pairs of second beams are non-differentially mapped.

For example, layer 1 measurement values corresponding to CSI measurement resource indicators arranged in first positions in each of the N pairs of first beams are sorted in descending order, CSI measurement resource indicators corresponding to each pair of first beams are sorted in descending order of layer 1 measurement values corresponding to the CSI measurement resource indicators, and the layer 1 measurement values corresponding to the CSI measurement resource indicators arranged in the first positions in each of the N pairs of first beams are non-differentially mapped; and the T pairs of second beams are sorted in descending order based on layer 1 measurement values corresponding to CSI measurement resource indicators arranged in first positions in each pair of second beams, CSI measurement resource indicators corresponding to each pair of second beams are sorted in descending order based on layer 1 measurement values corresponding to the CSI measurement resource indicators, and the CSI measurement resource indicators arranged in the first positions in each of the T pairs of second beams are non-differentially mapped.

Optionally, in this embodiment of this application, in a case that the preset manner is querying whether the N pairs of first beams and/or the M second beams satisfy the first condition, the second condition, or the third condition, that the network-side device determines the beam reporting type of the CSI report in a preset manner includes:

- if the network-side device determines that measurement values corresponding to target CSI measurement resource indicators in the information about the target beams satisfy the first condition, determining that the beam reporting type is group-based beam reporting;
- if the network-side device determines that measurement values corresponding to target CSI measurement resource indicators in the information about the target beams satisfy the second condition, determining that the beam reporting type is non-group-based beam reporting; or
- if the network-side device determines that measurement values corresponding to target CSI measurement resource indicators in the information about the target beams satisfy the third condition, determining that the beam reporting type includes group-based beam reporting and non-group-based beam reporting.

For example, in a case that the network-side device determines that the beam reporting type is group-based beam reporting, the network-side device subsequently communicates with the terminal through mTRP transmission.

For example, in a case that the network-side device determines that the beam reporting type is non-group-based beam reporting, the network-side device subsequently communicates with the terminal through sTRP transmission.

For example, in a case that the network-side device determines that the beam reporting type is group-based and non-group-based hybrid beam reporting, the network-side device uses a part of measurement resource indicators corresponding to the group-based reporting hypothesis type for mTRP transmission, and uses a part of measurement resource indicators corresponding to the non-group-based reporting hypothesis type for sTRP transmission.

It should be noted that after the network-side device receives a PUCCH/PUSCH carrying UCI, the network-side device combines information about two adjacent beams in the UCI. If inversion occurs (that is, at least one layer 1 measurement value corresponding to a first measurement resource indicator in a beam pair arranged in a rear position is greater than a layer 1 measurement value corresponding to a first measurement resource indicator of a beam pair arranged in a front position), it can be known that the received beam information is reported based on the hybrid beam reporting type, and a CRI or an SSBRI before the position in which the inversion occurs for the first time is group-based reported and can be used for mTRP transmission, while a CRI or an SSBRI after this position is non-group-based reported and can be used for sTRP transmission.

It should be noted that the channel state information CSI report mapping method provided in this embodiment of this application may be performed by a channel state information CSI report mapping apparatus, or a control module for performing the channel state information CSI report mapping method in the channel state information CSI report mapping apparatus. A channel state information CSI report mapping apparatus provided in an embodiment of this application is described by assuming that the channel state information CSI report mapping method is performed by the channel state information CSI report mapping apparatus in this embodiment of this application.

Figure 8:
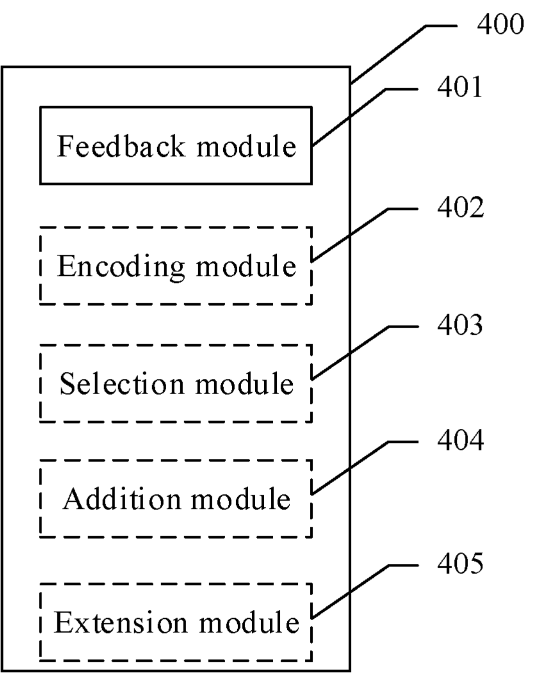
FIG. 8 is a first schematic diagram of a structure of a channel state information CSI report mapping apparatus according to an embodiment of this application.

An embodiment of this application provides a channel state information CSI report mapping apparatus. As shown in FIG. 8, the channel state information CSI report mapping apparatus 400 includes a feedback module 401. The feedback module 401 is configured to feed back X CSI reports to a network-side device through a target channel according to a preset mapping rule, where the CSI report includes at least one of the following: information for indicating a beam reporting type and information about target beams; the target beams include at least one of the following: N pairs of first beams that can be simultaneously received by a terminal, and M second beams whose measurement values satisfy a predetermined condition, where N is a positive integer greater than or equal to 1, and X and M are positive integers; and the preset mapping rule is a mapping rule that matches the beam reporting type.

The channel state information CSI report mapping apparatus provided in this embodiment of this application maps the X CSI reports (the CSI report includes the information for indicating the beam reporting type and/or the information about the target beams) to UCI, and then feeds back the X CSI reports to the network-side device through the target channel (for example, a physical uplink control channel (PUCCH) or a physical uplink shared channel (PUSCH)), so that the network-side device performs communication and transmission with the channel state information CSI report mapping apparatus based on a mapping result reported by the channel state information CSI report mapping apparatus. In the foregoing process, because the target beams include the N pairs of first beams that can be simultaneously received by the terminal, (N is a positive integer greater than 1), and/or the M second beams whose measurement values satisfy the predetermined condition (M is a positive integer), in a case that the beam reporting type is group-based beam reporting, the method provided in the embodiments of this application can enable the terminal to simultaneously report a plurality of pairs of beams, instead of reporting only one pair of beams.

Optionally, in this embodiment of this application, the beam reporting type includes any one of the following: group-based beam reporting, non-group-based beam reporting, and group-based and non-group-based hybrid beam reporting; and the beam reporting type is configured by the network-side device for the terminal, or determined by the terminal according to a preset rule of the network-side device.

Optionally, in this embodiment of this application, the information about the target beams includes at least one of the following: target CSI measurement resource indicators and measurement values of target CSI measurement resources; and the target CSI measurement resource indicators are CSI reference signal resource indicators CRIs or system synchronization block resource indicators SSBRIs, and the measurement values of the target CSI measurement resources are layer 1 measurement values.

Optionally, in this embodiment of this application, values of M and N can be configured by the network-side device by using RRC signaling, or configured by using RRC signaling, and selected, determined, and modified by using a MAC-CE.

Optionally, in this embodiment of this application, when the beam reporting type is configured by the network-side device for the terminal, the beam reporting type may be modified by the network-side device by using a MAC-CE.

Optionally, in this embodiment of this application, in a case that the target CSI report includes the target CSI measurement resource indicators, the apparatus 400 further includes an encoding module 402, where the encoding module is configured to encode the target CSI measurement resource indicators based on a preset encoding mode, where the target CSI measurement resource indicators include all target CSI measurement resource indicators or a part of target CSI measurement resource indicators; and the preset encoding mode includes at least one of the following: performing encoding based on a quantity of channel measurement resources CMRs configured in a CSI measurement resource setting; performing encoding based on a quantity of CMRs configured in a CSI measurement resource set; performing encoding based on a quantity of CMRs configured in a CSI measurement resource subset in the CSI measurement resource set; and performing joint encoding based on CMR resources.

Optionally, in this embodiment of this application, in a case that the beam reporting type is configured by the network-side device, or determined by the terminal according to the preset rule of the network-side device, the apparatus 400 further includes a selection module 403, where if the beam reporting type is group-based beam reporting, the selection module 403 is configured to select to report information about the N pairs of first beams that can be simultaneously received by the terminal, where target CSI measurement resource indicators in information about each pair of first beams correspond to different CSI measurement resources; if the beam reporting type is non-group-based beam reporting, the selection module 403 is further configured to select to report information about the M second beams that satisfy the predetermined condition; or if the beam reporting type includes group-based and non-group-based hybrid beam reporting, the selection module 403 is further configured to select to report information about Q pairs of first beams and information about W second beams, where Q is less than or equal to N, W is less than or equal to M, Q and W can be configured by the network-side device or set according to a preset rule, and Q and W are positive integers; and the CSI measurement resources include any one of the following: a CSI measurement resource setting, a CSI measurement resource set, and a CSI measurement resource subset.

Optionally, in this embodiment of this application, in a case that the beam reporting type is determined by the terminal according to the preset rule of the network-side device, the beam reporting type can be indicated in either of the following manners: the beam reporting type is indicated by a target field in the CSI report; and the beam reporting type is indicated based on a value relationship between a measurement value of a CSI measurement resource and a target measurement threshold in the CSI report, where the target measurement threshold is configured by the network-side device, or preset by the network-side device and the terminal.

Optionally, in this embodiment of this application, in a case that the beam reporting type is configured by the network-side device for the terminal, or determined by the terminal according to the preset rule of the network-side device, in a case that the beam reporting type is group-based beam reporting, the preset mapping rule includes either of the following: a first rule; and a second rule, where the first rule includes: a first CSI measurement resource indicator is arranged in a first position, and CSI measurement resource indicators of remaining beams are sequentially arranged in a form of beam pairs, where the first CSI measurement resource indicator is a measurement resource indicator corresponding to a beam whose layer 1 measurement value is largest among the N pairs of first beams; and the second rule includes: if the first rule is satisfied, the layer 1 measurement value corresponding to the first CSI measurement resource indicator is mapped, and layer 1 measurement values of the remaining beams are mapped based on differences between the layer 1 measurement value corresponding to the first CSI measurement resource indicator and the layer 1 measurement values of the remaining beams.

Optionally, in this embodiment of this application, in a case that the beam reporting type is group-based and non-group-based hybrid beam reporting, the preset mapping rule includes either of the following: a third rule; and a fourth rule, where the third rule includes: a second CSI measurement resource indicator is arranged in a first position, and an arrangement order of the N pairs of first beams and the M second beams is determined based on a beam reporting type of a beam corresponding to the second CSI measurement resource indicator, where the second CSI measurement resource indicator is a CSI measurement resource indicator corresponding to a beam whose layer 1 measurement value is largest among the N pairs of first beams and the M second beams; and the fourth rule includes: if the third rule is satisfied, the layer 1 measurement value corresponding to the second CSI measurement resource indicator is mapped, and layer 1 measurement values of remaining beams are mapped based on differences between the layer 1 measurement value corresponding to the second CSI measurement resource indicator and the layer 1 measurement values of the remaining beams.

Optionally, in this embodiment of this application, the apparatus 400 further includes an addition module 404 and an extension module 405, where the addition module 404 is configured to add a first indicator field before an indicator field corresponding to a third CSI measurement resource indicator; or the extension module 405 is configured to extend a second indicator field corresponding to a third CSI measurement resource indicator, where the first indicator field and the second indicator field are used to indicate the beam reporting type, where the third CSI measurement resource indicator is either of the following: the second CSI measurement resource indicator; and all CSI measurement resource indicators in the N pairs of first beams and the M second beams.

Optionally, in this embodiment of this application, in a case that the beam reporting type is determined by the terminal according to the preset rule of the network-side device, and that the beam reporting type is group-based beam reporting, the preset mapping rule includes: a first CSI measurement resource indicator corresponding to a beam whose layer 1 measurement value is largest among the N pairs of first beams is arranged in a first position, and CSI measurement resource indicators of remaining first beam pairs are sequentially arranged in a form of beam pairs, where the remaining first beam pairs include other beam pairs than a beam pair including the beam whose layer 1 measurement value is the largest among the N pairs of first beams, where first beam pairs generated by the remaining first beam pairs satisfy a first relationship, and the first relationship is a fixed value relationship between layer 1 measurement values in each of the first beam pairs.

Optionally, in this embodiment of this application, in a case that the beam reporting type is determined by the terminal according to the preset rule of the network-side device, and that the beam reporting type is non-group-based beam reporting, the preset mapping rule includes: a second CSI measurement resource indicator corresponding to a beam whose layer 1 measurement value is largest among the M second beams is arranged in a first position, and CSI measurement resource indicators of remaining second beams are sequentially arranged, where the remaining second beams are other beams than the beam whose layer 1 measurement value is the largest among the M second beams; and second beam pairs are generated by pairing the second beams, where the second beam pairs satisfy a second condition, and the second condition is: among the second beam pairs, there is at least one pair with a fixed value relationship between layer 1 measurement values corresponding to CSI measurement resource indicators.

Optionally, in this embodiment of this application, in a case that the beam reporting type is determined by the terminal according to the preset rule of the network-side device, and that the beam reporting type is group-based and non-group-based hybrid beam reporting, the preset mapping rule includes: T pairs of second beams are generated by pairing the M second beams, where the N pairs of first beams and the T pairs of second beams satisfy a third condition, and the third condition includes: the N pairs of first beams are arranged before the T pairs of second beams; layer 1 measurement values corresponding to CSI measurement resource indicators arranged in first positions in each of the N pairs of first beams are sorted in descending order, layer 1 measurement values corresponding to CSI measurement resource indicators corresponding to each pair of first beams are sorted in descending order, and the layer 1 measurement values corresponding to the CSI measurement resource indicators arranged in the first positions in each of the N pairs of first beams are non-differentially mapped; and layer 1 measurement values corresponding to CSI measurement resource indicators arranged in first positions in each of the T pairs of second beams are sorted in descending order, layer 1 measurement values corresponding to CSI measurement resource indicators corresponding to each pair of second beams are sorted in descending order, and the layer 1 measurement values corresponding to the CSI measurement resource indicators arranged in the first positions in each of the T pairs of second beams are non-differentially mapped.

Figure 9:
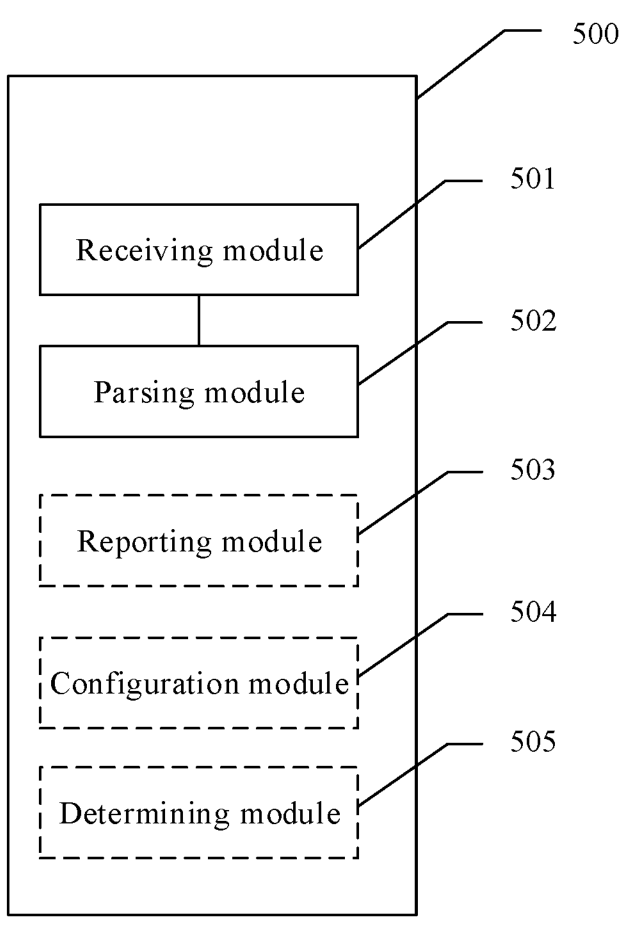
FIG. 9 is a second schematic diagram of a structure of a channel state information CSI report mapping apparatus according to an embodiment of this application.

An embodiment of this application provides a channel state information CSI report mapping apparatus. As shown in FIG. 9, the channel state information CSI report mapping apparatus 500 includes a receiving module 501 and a parsing module 502. The receiving module 501 is configured to receive a CSI report reported by a terminal. The parsing module 502 is configured to parse, based on a beam reporting type, the CSI report received by the receiving module 501, where the CSI report includes at least one of the following: information for indicating the beam reporting type and information about target beams; the target beams include at least one of the following: N pairs of first beams that can be simultaneously received by the terminal, and M second beams whose measurement values satisfy a predetermined condition, where N is a positive integer greater than 1, and M is a positive integer; and the beam reporting type is configured by a network-side device for the terminal, or determined by the terminal according to a preset rule of a network-side device; and the beam reporting type includes at least one of the following: group-based beam reporting, non-group-based beam reporting, and group-based and non-group-based hybrid beam reporting.

The channel state information CSI report mapping apparatus provided in this embodiment of this application may parse the CSI report based on the beam reporting type after receiving the CSI report reported by the terminal. In the foregoing process, the channel state information CSI report mapping apparatus may receive CSI reports provided by the terminal in a plurality of beam reporting manners, and flexibly perform parsing in a parsing manner corresponding to a corresponding preset mapping manner.

Optionally, in this embodiment of this application, the apparatus 500 further includes a reporting module 503 and a configuration module 504, where the reporting module 503 is configured to configure the beam reporting type in a CSI report configuration; or the configuration module 504 is configured to configure the beam reporting type by presetting the preset rule for the terminal, where the preset rule corresponds to the beam reporting type.

Optionally, in this embodiment of this application, in a case that the network-side device does not configure the beam reporting type in a CSI report configuration, the apparatus further includes a determining module 505, where the determining module is configured to determine the beam reporting type of the CSI report in a preset manner, where the preset manner includes any one of the following: querying the beam reporting type indicated by a target field; querying a value relationship between a measurement value of a CSI measurement resource and a target measurement threshold in the CSI report, where the value relationship is used to indicate the beam reporting type; and querying whether the N pairs of first beams and/or the M second beams satisfy a first relationship, a second relationship, or a third relationship.

Optionally, in this embodiment of this application, the first condition is a fixed value relationship between layer 1 measurement values in each of first beam pairs of remaining first beam pairs, where the remaining first beam pairs include other beam pairs than a beam pair of a beam whose layer 1 measurement value is largest among the N pairs of first beams; the second condition is: among second beam pairs, there is at least one pair with a fixed value relationship between layer 1 measurement values corresponding to CSI measurement resource indicators, and among second beam pairs, there is at least one pair with a fixed value relationship between layer 1 measurement values corresponding to CSI measurement resource indicators, where the second beam pairs are beam pairs generated by the terminal by pairing the second beams; and the third condition includes: layer 1 measurement values corresponding to CSI measurement resource indicators arranged in first positions in each of the N pairs of first beams are sorted in descending order, and layer 1 measurement values corresponding to CSI measurement resource indicators corresponding to each pair of first beams are sorted in descending order; and layer 1 measurement values corresponding to CSI measurement resource indicators arranged in first positions in each of T pairs of second beams are sorted in descending order, and layer 1 measurement values corresponding to CSI measurement resource indicators corresponding to each pair of second beams are sorted in descending order.

Optionally, in this embodiment of this application, in a case that the preset manner is querying whether the N pairs of first beams and/or the M second beams satisfy the first condition, the second condition, or the third condition, the determining module 505 is specifically configured to determine that the beam reporting type is group-based beam reporting if it is determined that measurement values corresponding to target CSI measurement resource indicators in the information about the target beams satisfy the first condition; the determining module 505 is specifically configured to determine that the beam reporting type is non-group-based beam reporting if it is determined that measurement values corresponding to target CSI measurement resource indicators in the information about the target beams satisfy the second condition; or the determining module 505 is specifically configured to determine that the beam reporting type includes group-based beam reporting and non-group-based beam reporting if it is determined that measurement values corresponding to target CSI measurement resource indicators in the information about the target beams satisfy the third condition.

The channel state information CSI report mapping apparatus in this embodiment of this application may be an apparatus, or an apparatus or an electronic device with an operating system, or may be a component, an integrated circuit, or a chip in a terminal. The apparatus or the electronic device may be a mobile terminal, or may be a nonmobile terminal. For example, the mobile terminal may include but is not limited to the foregoing illustrated type of the terminal 11. The nonmobile terminal may be a server, a network attached storage (NAS), a personal computer (PC), a television (TV), a teller machine, a self-service machine, or the like. This is not specifically limited in this embodiment of this application.

The channel state information CSI report mapping apparatus provided in this embodiment of this application can implement each process implemented by the method embodiments in FIG. 1 to FIG. 7, with the same technical effect achieved. To avoid repetition, details are not described herein again.

Figure 10:
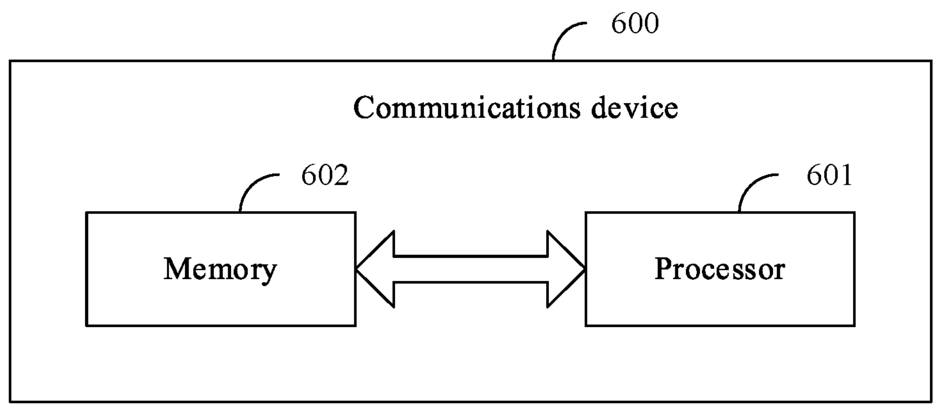
FIG. 10 is a schematic diagram of a structure of a communications device according to an embodiment of this application.

Optionally, as shown in FIG. 10, an embodiment of this application further provides a communications device 600, including a processor 601, a memory 602, and a program or instructions stored in the memory 602 and capable of running on the processor 601. For example, when the communications device 600 is a terminal, and the program or instructions are executed by the processor 601, each process of the foregoing embodiment of the channel state information CSI report mapping method is implemented, with the same technical effect achieved. When the communications device 600 is a network-side device, and the program or instructions are executed by the processor 601, each process of the foregoing embodiment of the channel state information CSI report mapping method is implemented, with the same technical effect achieved. To avoid repetition, details are not described herein again.

Figure 11:
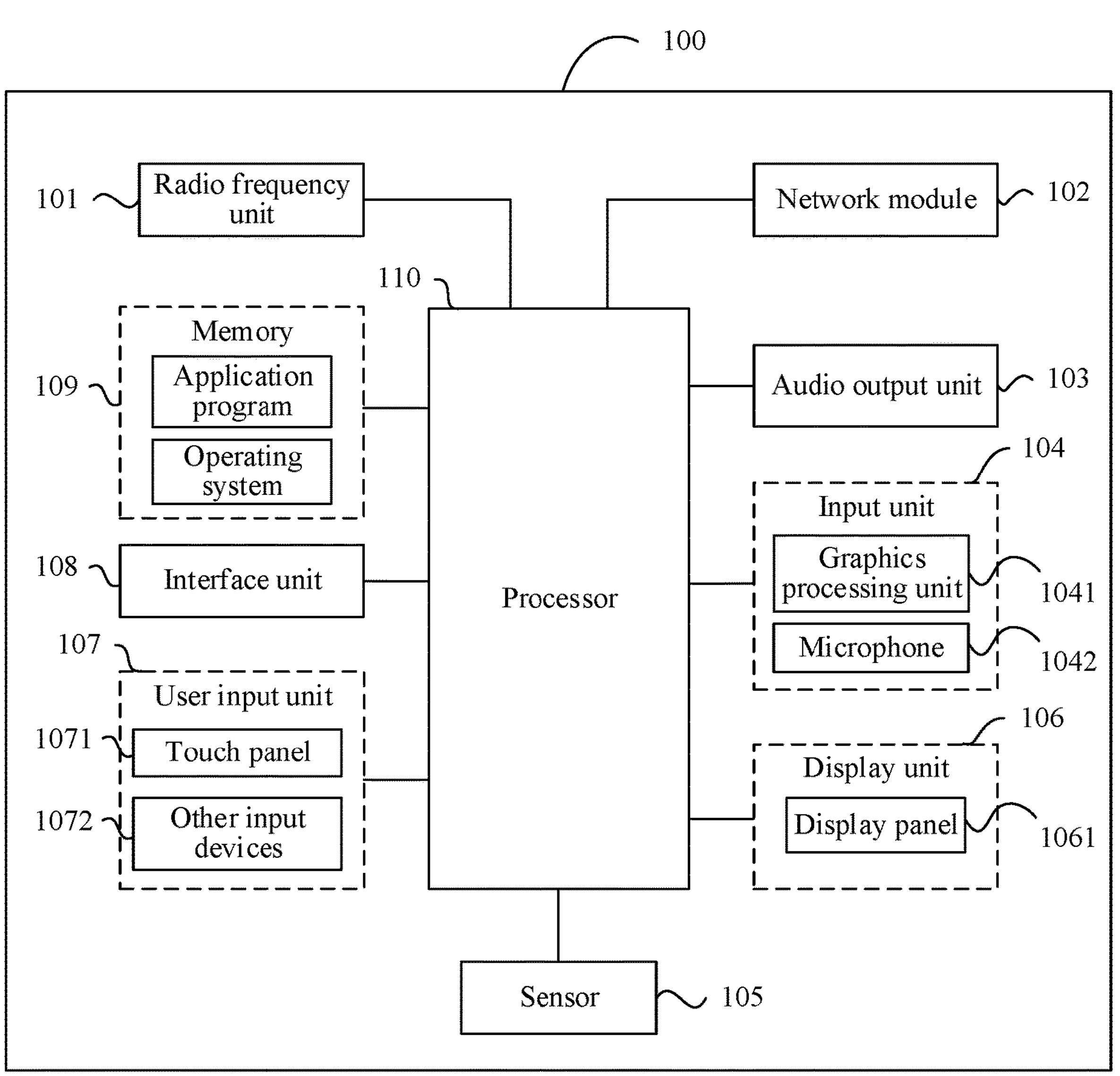
FIG. 11 is a schematic diagram of a hardware structure of a terminal according to an embodiment of this application.

An embodiment of this application further provides a terminal, including a processor and a communications interface, where the communications interface is configured to feed back X CSI reports to a network-side device through a target channel according to a preset mapping rule. This terminal embodiment corresponds to the foregoing terminal-side method embodiment, and each implementation process and implementation of the foregoing method embodiment can be applied to this terminal embodiment, with the same technical effect achieved. Specifically, FIG. 11 is a schematic diagram of a hardware structure of a terminal for implementing an embodiment of this application.

The terminal 100 includes but is not limited to at least some components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the terminal 100 may further include a power supply (for example, a battery) supplying power to all components. The power supply may be logically connected to the processor 110 through a power management system. In this way, functions such as charge management, discharge management, and power consumption management are implemented by using the power management system. The terminal structure shown in FIG. 11 does not constitute a limitation on the terminal. The terminal may include more or fewer components than those shown in the figure, or some components are combined, or component arrangements are different. Details are not described herein again.

It should be understood that, in this embodiment of this application, the input unit 104 may include a graphics processing unit (GPU) 1041 and a microphone 1042. The graphics processing unit 1041 processes image data of a still picture or video obtained by an image capture apparatus (such as a camera) in a video capture mode or an image capture mode. The display unit 106 may include a display panel 1061, and the display panel 1061 may be configured in a form of a liquid crystal display, an organic light-emitting diode, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a function key (such as a volume control key or a power key), a trackball, a mouse, and a joystick. Details are not described herein again.

In this embodiment of this application, after receiving downlink data from a network-side device, the radio frequency unit 101 sends the downlink data to the processor 110 for processing, and in addition, sends uplink data to the network-side device. Generally, the radio frequency unit 101 includes but is not limited to an antenna, at least one amplifier, a transceiver, a coupler, a low noise amplifier, a duplexer, and the like.

The memory 109 may be configured to store software programs or instructions and various data. The memory 109 may primarily include a program or instruction storage area and a data storage area. The program or instruction storage area may store an operating system, an application program or instructions (such as an audio play function and an image play function) required by at least one function, and the like. In addition, the memory 109 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 110 may include one or more processing units. Optionally, the processor 110 may integrate an application processor and a modem processor. The application processor mainly processes the operating system, a user interface, an application program, or an instruction. The modem processor mainly processes wireless communication. For example, the modem processor is a baseband processor. It may be understood that the modem processor may alternatively be not integrated in the processor 110.

The radio frequency unit 101 is configured to feed back X CSI reports to a network-side device through a target channel according to a preset mapping rule, where the CSI report includes at least one of the following: information for indicating a beam reporting type and information about target beams; the target beams include at least one of the following: N pairs of first beams that can be simultaneously received by the terminal, and M second beams whose measurement values satisfy a predetermined condition, where N is a positive integer greater than or equal to 1, and X and M are positive integers; and the preset mapping rule is a mapping rule that matches the beam reporting type.

The terminal provided in this embodiment of this application maps the X CSI reports (the CSI reports include the information for indicating the beam reporting type and/or the information about the target beams) to UCI according to the preset mapping rule matching the beam reporting type, and feeds back the X CSI reports to the network-side device through the target channel (for example, a physical uplink control channel (PUCCH) or a physical uplink shared channel (PUSCH)), so that the network-side device performs communication and transmission with the terminal based on a mapping result reported by the terminal. In the foregoing process, because the target beams include the N pairs of first beams that can be simultaneously received by the terminal, (N is a positive integer greater than 1), and/or the M second beams whose measurement values satisfy the predetermined condition (M is a positive integer), in a case that the beam reporting type is group-based beam reporting, the method provided in this embodiment of this application can enable the terminal to simultaneously report a plurality of pairs of beams, instead of reporting only one pair of beams.

Optionally, the beam reporting type includes any one of the following: group-based beam reporting, non-group-based beam reporting, and group-based and non-group-based hybrid beam reporting; and the beam reporting type is configured by the network-side device for the terminal, or determined by the terminal according to a preset rule of the network-side device.

Optionally, the information about the target beams includes at least one of the following: target CSI measurement resource indicators and measurement values of target CSI measurement resources; and the target CSI measurement resource indicators are CSI reference signal resource indicators CRIs or system synchronization block resource indicators SSBRIs, and the measurement values of the target CSI measurement resources are layer 1 measurement values.

Optionally, values of M and N can be configured by the network-side device by using RRC signaling, or configured by using RRC signaling, and selected, determined, and modified by using a MAC-CE.

Optionally, when the beam reporting type is configured by the network-side device for the terminal, the beam reporting type can be modified by the network-side device by using a MAC-CE.

Optionally, in a case that the target CSI report includes the target CSI measurement resource indicators, the processor 110 is configured to encode the target CSI measurement resource indicators based on a preset encoding mode, where the target CSI measurement resource indicators include all target CSI measurement resource indicators or a part of target CSI measurement resource indicators; and the preset encoding mode includes at least one of the following: performing encoding based on a quantity of channel measurement resources CMRs configured in a CSI measurement resource setting; performing encoding based on a quantity of CMRs configured in a CSI measurement resource set; performing encoding based on a quantity of CMRs configured in a CSI measurement resource subset in the CSI measurement resource set; and performing joint encoding based on CMR resources.

Optionally, in a case that the beam reporting type is configured by the network-side device, or determined by the terminal according to the preset rule of the network-side device, if the beam reporting type is group-based beam reporting, the radio frequency unit 101 is specifically configured to select to report information about the N pairs of first beams that can be simultaneously received by the terminal, where target CSI measurement resource indicators in information about each pair of first beams correspond to different CSI measurement resources; if the beam reporting type is non-group-based beam reporting, the radio frequency unit 101 is further specifically configured to select to report information about the M second beams that satisfy the predetermined condition; or if the beam reporting type includes group-based and non-group-based hybrid beam reporting, the radio frequency unit 101 is further specifically configured to select to report information about Q pairs of first beams and information about W second beams, where Q is less than or equal to N, W is less than or equal to M, Q and W can be configured by the network-side device or set according to a preset rule, and Q and W are positive integers; and the CSI measurement resources include any one of the following: a CSI measurement resource setting, a CSI measurement resource set, and a CSI measurement resource subset.

Optionally, in a case that the beam reporting type is determined by the terminal according to the preset rule of the network-side device, the beam reporting type can be indicated in either of the following manners: the beam reporting type is indicated by a target field in the CSI report; and the beam reporting type is indicated based on a value relationship between a measurement value of a CSI measurement resource and a target measurement threshold in the CSI report, where the target measurement threshold is configured by the network-side device, or preset by the network-side device and the terminal.

Optionally, in a case that the beam reporting type is configured by the network-side device for the terminal, or determined by the terminal according to the preset rule of the network-side device, in a case that the beam reporting type is group-based beam reporting, the preset mapping rule includes either of the following: a first rule; and a second rule, where the first rule includes: a first CSI measurement resource indicator is arranged in a first position, and CSI measurement resource indicators of remaining beams are sequentially arranged in a form of beam pairs, where the first CSI measurement resource indicator is a measurement resource indicator corresponding to a beam whose layer 1 measurement value is largest among the N pairs of first beams; and the second rule includes: if the first rule is satisfied, the layer 1 measurement value corresponding to the first CSI measurement resource indicator is mapped, and layer 1 measurement values of the remaining beams are mapped based on differences between the layer 1 measurement value corresponding to the first CSI measurement resource indicator and the layer 1 measurement values of the remaining beams.

Optionally, in a case that the beam reporting type is group-based and non-group-based hybrid beam reporting, the preset mapping rule includes either of the following: a third rule; and a fourth rule, where the third rule includes: a second CSI measurement resource indicator is arranged in a first position, and an arrangement order of the N pairs of first beams and the M second beams is determined based on a beam reporting type of a beam corresponding to the second CSI measurement resource indicator, where the second CSI measurement resource indicator is a CSI measurement resource indicator corresponding to a beam whose layer 1 measurement value satisfies the predetermined condition among the N pairs of first beams and the M second beams; and the fourth rule includes: if the third rule is satisfied, the layer 1 measurement value corresponding to the second CSI measurement resource indicator is mapped, and layer 1 measurement values of remaining beams are mapped based on differences between the layer 1 measurement value corresponding to the second CSI measurement resource indicator and the layer 1 measurement values of the remaining beams.

Optionally, the processor 110 is further configured to add a first indicator field before an indicator field corresponding to a third CSI measurement resource indicator; or the processor 110 is further configured to extend a second indicator field corresponding to a third CSI measurement resource indicator, where the first indicator field and the second indicator field are used to indicate the beam reporting type, where the third CSI measurement resource indicator is either of the following: the second CSI measurement resource indicator; and all CSI measurement resource indicators in the N pairs of first beams and the M second beams.

Optionally, in a case that the beam reporting type is determined by the terminal according to the preset rule of the network-side device, and that the beam reporting type is group-based beam reporting, the preset mapping rule includes: a first CSI measurement resource indicator corresponding to a beam whose layer 1 measurement value is largest among the N pairs of first beams is arranged in a first position, and CSI measurement resource indicators of remaining first beam pairs are sequentially arranged in a form of beam pairs, where the remaining first beam pairs include other beam pairs than a beam pair including the beam whose layer 1 measurement value is the largest, where first beam pairs generated by the remaining first beam pairs satisfy a first relationship, and the first relationship is a fixed value relationship between layer 1 measurement values in each of the first beam pairs.

Optionally, in a case that the beam reporting type is determined by the terminal according to the preset rule of the network-side device, and that the beam reporting type is non-group-based beam reporting, the preset mapping rule includes: a second CSI measurement resource indicator corresponding to a beam whose layer 1 measurement value is largest among the M second beams is arranged in a first position, and CSI measurement resource indicators of remaining second beams are sequentially arranged, where the remaining second beams are other beams than the beam whose layer 1 measurement value is the largest among the M second beams; and second beam pairs are generated by pairing the second beams, where the second beam pairs satisfy a second condition, and the second condition is: among the second beam pairs, there is at least one pair with a fixed value relationship between layer 1 measurement values corresponding to CSI measurement resource indicators.

Optionally, in a case that the beam reporting type is determined by the terminal according to the preset rule of the network-side device, and that the beam reporting type is group-based and non-group-based hybrid beam reporting, the preset mapping rule includes: T pairs of second beams are generated by pairing the M second beams, where the N pairs of first beams and the T pairs of second beams satisfy a third relationship, and the third relationship includes: the N pairs of first beams are arranged before the T pairs of second beams; layer 1 measurement values corresponding to CSI measurement resource indicators arranged in first positions in each of the N pairs of first beams are sorted in descending order, layer 1 measurement values corresponding to CSI measurement resource indicators corresponding to each pair of first beams are sorted in descending order, and the layer 1 measurement values corresponding to the CSI measurement resource indicators arranged in the first positions in each of the N pairs of first beams are non-differentially mapped; and layer 1 measurement values corresponding to CSI measurement resource indicators arranged in first positions in each of the T pairs of second beams are sorted in descending order, layer 1 measurement values corresponding to CSI measurement resource indicators corresponding to each pair of second beams are sorted in descending order, and the layer 1 measurement values corresponding to the CSI measurement resource indicators arranged in the first positions in each of the T pairs of second beams are non-differentially mapped.

An embodiment of this application further provides a network-side device, including a processor and a communications interface. The communications interface is configured to receive a CSI report reported by a terminal. The processor is configured to parse the CSI report based on a beam reporting type, where the CSI report includes at least one of the following: information for indicating the beam reporting type and information about target beams; the target beams include at least one of the following: N pairs of first beams that can be simultaneously received by the terminal, and M second beams whose measurement values satisfy a predetermined condition, where N is a positive integer greater than or equal to 1, and M is a positive integer; and the beam reporting type is configured by the network-side device for the terminal, or determined by the terminal according to a preset rule of the network-side device; and the beam reporting type includes at least one of the following: group-based beam reporting, non-group-based beam reporting, and group-based and non-group-based hybrid beam reporting. The network-side device embodiment corresponds to the foregoing method embodiment of the network-side device, and each implementation process and implementation of the foregoing method embodiment can be applied to the network-side device embodiment, with the same technical effect achieved.

Figure 12:
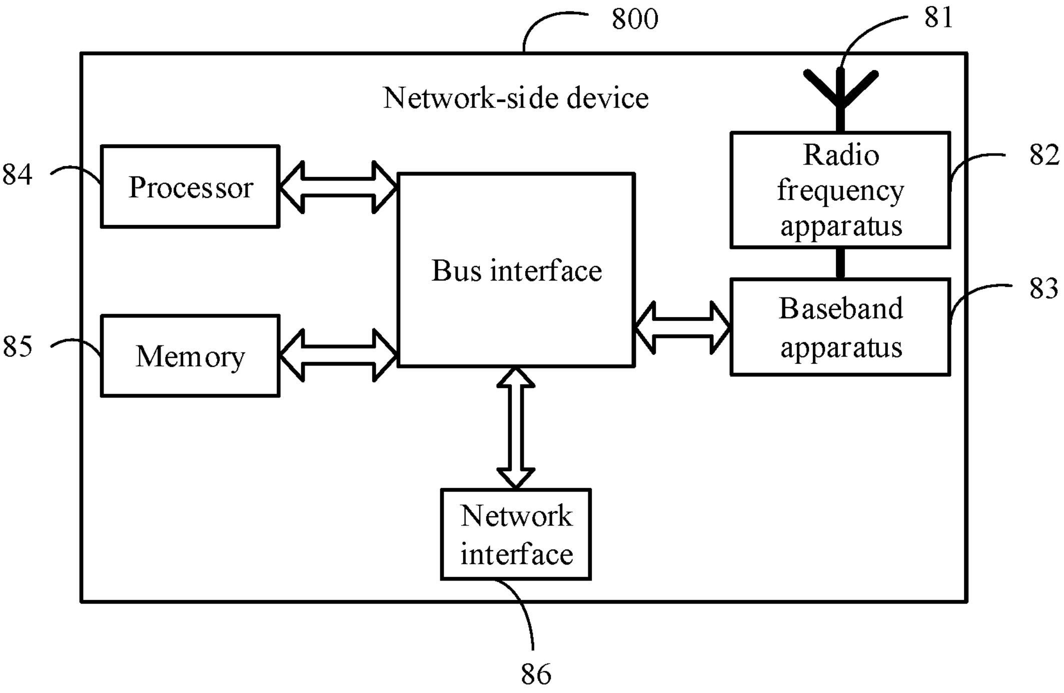
FIG. 12 is a schematic diagram of a hardware structure of a network-side device according to an embodiment of this application.

Specifically, an embodiment of this application further provides a network-side device. As shown in FIG. 12, the network-side device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and sends the received information to the baseband apparatus 83 for processing. In a downlink direction, the baseband apparatus 83 processes to-be-sent information, and sends the information to the radio frequency apparatus 82; and the radio frequency apparatus 82 processes the received information and then sends the information out by using the antenna 81.

The radio frequency apparatus may be located in the baseband apparatus 83. The method performed by the network-side device in the foregoing embodiment may be implemented in the baseband apparatus 83, and the baseband apparatus 83 includes a processor 84 and a memory 85.

The baseband apparatus 83 may include, for example, at least one baseband processing unit, where a plurality of chips are disposed on the baseband processing unit. As shown in FIG. 12, one of the chips is, for example, the processor 84, connected to the memory 85, to invoke a program in the memory 85 to perform the operation of the network-side device shown in the foregoing method embodiment.

The baseband apparatus 83 may further include a network interface 86, configured to exchange information with the radio frequency apparatus 82, where the interface is, for example, a common public radio interface (CPRI).

Specifically, the network-side device in this embodiment of the present invention further includes a program or instructions stored in the memory 85 and capable of running on the processor 84. When the processor 84 invokes the program or instructions in the memory 85, the method performed by each module shown in FIG. 12 is performed, with the same technical effect achieved. To avoid repetition, details are not described herein again.

In the network-side device, the antenna 81 is configured to receive a CSI report reported by a terminal; and the processor 84 is configured to parse the CSI report based on a beam reporting type, where the CSI report includes at least one of the following: information for indicating the beam reporting type and information about target beams; the target beams include at least one of the following: N pairs of first beams that can be simultaneously received by the terminal, and M second beams whose measurement values satisfy a predetermined condition, where N is a positive integer greater than 1, and M is a positive integer; and the beam reporting type is configured by the network-side device for the terminal, or determined by the terminal according to a preset rule of the network-side device; and the beam reporting type includes at least one of the following: group-based beam reporting, non-group-based beam reporting, and group-based and non-group-based hybrid beam reporting.

In this embodiment of this application, the network-side device may parse the CSI report based on the beam reporting type after receiving the CSI report reported by the terminal. In the foregoing process, the network-side device may receive CSI reports provided by the terminal in a plurality of beam reporting manners, and flexibly perform parsing in a parsing manner corresponding to a corresponding preset mapping manner.

Optionally, the processor 84 is configured to configure the beam reporting type in a CSI report configuration; or configure the beam reporting type by presetting the preset rule for the terminal, where the preset rule corresponds to the beam reporting type.

Optionally, in a case that the network-side device does not configure the beam reporting type in a CSI report configuration, the processor 84 is further configured to determine the beam reporting type of the CSI report in a preset manner, where the preset manner includes any one of the following: querying the beam reporting type indicated by a target field; querying a value relationship between a measurement value of a CSI measurement resource and a target measurement threshold in the CSI report, where the value relationship is used to indicate the beam reporting type; and querying whether the N pairs of first beams and/or the M second beams satisfy a first condition, a second condition, or a third condition.

Optionally, the first condition is a fixed value relationship between layer 1 measurement values in each of first beam pairs generated by remaining first beam pairs, where the remaining first beam pairs include other beam pairs than a beam pair of a beam whose layer 1 measurement value is largest among the N pairs of first beams; the second condition is: among second beam pairs, there is at least one pair with a fixed value relationship between layer 1 measurement values corresponding to CSI measurement resource indicators, and among second beam pairs, there is at least one pair with a fixed value relationship between layer 1 measurement values corresponding to CSI measurement resource indicators, where the second beam pairs are beam pairs generated by the terminal by pairing the second beams; and the third condition includes: layer 1 measurement values corresponding to CSI measurement resource indicators arranged in first positions in each of the N pairs of first beams are sorted in descending order, and layer 1 measurement values corresponding to CSI measurement resource indicators corresponding to each pair of first beams are sorted in descending order; and layer 1 measurement values corresponding to CSI measurement resource indicators arranged in first positions in each of the T pairs of second beams are sorted in descending order, and layer 1 measurement values corresponding to CSI measurement resource indicators corresponding to each pair of second beams are sorted in descending order.

Optionally, in a case that the preset manner is querying whether the N pairs of first beams and/or the M second beams satisfy the first condition, the second condition, or the third condition, the processor 84 is specifically further configured to determine that the beam reporting type is group-based beam reporting if it is determined that measurement values corresponding to target CSI measurement resource indicators in the information about the target beams satisfy the first condition; the processor 84 is specifically further configured to determine that the beam reporting type is non-group-based beam reporting if it is determined that measurement values corresponding to target CSI measurement resource indicators in the information about the target beams satisfy the second condition; or the processor 84 is specifically further configured to determine that the beam reporting type includes group-based beam reporting and non-group-based beam reporting if it is determined that measurement values corresponding to target CSI measurement resource indicators in the information about the target beams satisfy the third condition.

An embodiment of this application further provides a readable storage medium. The readable storage medium stores a program or instructions. When the program or instructions are executed by a processor, each process of the foregoing embodiment of the channel state information CSI report mapping method is implemented, with the same technical effect achieved. To avoid repetition, details are not described herein again.

The processor is a processor in the terminal in the foregoing embodiment. The readable storage medium includes a computer-readable storage medium, for example, a computer read-only memory (ROM), a random access memory (RAM), a magnetic disk, or an optical disc.

In addition, an embodiment of this application provides a chip. The chip includes a processor and a communications interface. The communications interface is coupled to the processor. The processor is configured to run a program or instructions to implement each process of the embodiment of the channel state information CSI report mapping method, with the same technical effect achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term “comprise”, “include”, or any variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A channel state information, CSI, report mapping method, comprising:

feeding back, by a terminal, X CSI reports to a network-side device according to a preset mapping rule, wherein the CSI report comprises information about target beams;

the target beams comprise N pairs of first beams that can be simultaneously received by the terminal, wherein N is a positive integer greater than 1; and the preset mapping rule is a mapping rule that matches group-based beam reporting;

wherein the preset mapping rule comprises a first rule; wherein the first rule comprises: a first CSI measurement resource indicator is arranged in a first position, and CSI measurement resource indicators of remaining beams are sequentially arranged in a form of beam pairs, wherein the first CSI measurement resource indicator is a CSI measurement resource indicator corresponding to a beam whose layer 1 measurement value is largest among the N pairs of first beams; and if the first rule is satisfied, the layer 1 measurement value corresponding to the first CSI measurement resource indicator is mapped, and layer 1 measurement values of the remaining beams are mapped based on differences between the layer 1 measurement value corresponding to the first CSI measurement resource indicator and the layer 1 measurement values of the remaining beams.

2. The method according to claim 1, wherein the CSI report further comprises information for indicating a beam reporting type, the beam reporting type comprises any one of the following: the group-based beam reporting, non-group-based beam reporting, and group-based and non-group-based hybrid beam reporting; and the beam reporting type is configured by the network-side device for the terminal, or determined by the terminal according to a preset rule of the network-side device.

3. The method according to claim 2, wherein in a case that the beam reporting type is configured by the network-side device, or determined by the terminal according to the preset rule of the network-side device, if the beam reporting type is group-based beam reporting, the terminal selects to report information about the N pairs of first beams that can be simultaneously received by the terminal, wherein target CSI measurement resource indicators in information about each pair of first beams correspond to different CSI measurement resources;

the CSI measurement resources comprise: a CSI measurement resource set.

4. The method according to claim 1, wherein the information about the target beams comprises at least one of the following: target CSI measurement resource indicators and measurement values of target CSI measurement resources; and the target CSI measurement resource indicators are CSI reference signal resource indicators, CRIs, or system synchronization block resource indicators, SSBRIs, and the measurement values of the target CSI measurement resources are layer 1 measurement values.

5. The method according to claim 4, wherein in a case that the target CSI report comprises the target CSI measurement resource indicators, the method further comprises:

encoding, by the terminal, the target CSI measurement resource indicators based on a preset encoding mode, wherein the target CSI measurement resource indicators comprise all target CSI measurement resource indicators; and the preset encoding mode comprises:

the terminal performs encoding based on a quantity of CMRs configured in a CSI measurement resource set.

6. The method according to claim 1, wherein the CSI report further comprises an indication field which is used to indicate a CSI measurement resource set corresponding to the first CSI measurement resource indicator, and remaining CSI measurement resource indicators are mapped and arranged according to the preset mapping rule, and determine a correspondence between the first CSI measurement resource indicator and the CSI measurement resource set.

7. A terminal, comprising a processor, a memory, and a program or instructions stored in the memory and capable of running on the processor, wherein when the program or instructions are executed by the processor, implementing:

feeding back X CSI reports to a network-side device according to a preset mapping rule, wherein the CSI report comprises information about target beams;

the target beams comprise N pairs of first beams that can be simultaneously received by the terminal, wherein N is a positive integer greater than 1; and the preset mapping rule is a mapping rule that matches group-based beam reporting;

wherein the preset mapping rule comprises a first rule; wherein the first rule comprises: a first CSI measurement resource indicator is arranged in a first position, and CSI measurement resource indicators of remaining beams are sequentially arranged in a form of beam pairs, wherein the first CSI measurement resource indicator is a CSI measurement resource indicator corresponding to a beam whose layer 1 measurement value is largest among the N pairs of first beams; and if the first rule is satisfied, the layer 1 measurement value corresponding to the first CSI measurement resource indicator is mapped, and layer 1 measurement values of the remaining beams are mapped based on differences between the layer 1 measurement value corresponding to the first CSI measurement resource indicator and the layer 1 measurement values of the remaining beams.

8. The terminal according to claim 7, the CSI report further comprises information for indicating a beam reporting type, wherein the beam reporting type comprises any one of the following: the group-based beam reporting, non-group-based beam reporting, and group-based and non-group-based hybrid beam reporting; and the beam reporting type is configured by the network-side device for the terminal, or determined by the terminal according to a preset rule of the network-side device.

9. The terminal according to claim 8, wherein in a case that the beam reporting type is configured by the network-side device, or determined by the terminal according to the preset rule of the network-side device, if the beam reporting type is group-based beam reporting, the terminal selects to report information about the N pairs of first beams that can be simultaneously received by the terminal, wherein target CSI measurement resource indicators in information about each pair of first beams correspond to different CSI measurement resources;

the CSI measurement resources comprise: a CSI measurement resource set.

10. The terminal according to claim 7, wherein the information about the target beams comprises at least one of the following: target CSI measurement resource indicators and measurement values of target CSI measurement resources; and the target CSI measurement resource indicators are CSI reference signal resource indicators CRIs or system synchronization block resource indicators SSBRIs, and the measurement values of the target CSI measurement resources are layer 1 measurement values.

11. The terminal according to claim 10, wherein in a case that the target CSI report comprises the target CSI measurement resource indicators, the method further comprises:

encoding, by the terminal, the target CSI measurement resource indicators based on a preset encoding mode, wherein the target CSI measurement resource indicators comprise all target CSI measurement resource indicators; and the preset encoding mode comprises:

the terminal performs encoding based on a quantity of CMRs configured in a CSI measurement resource set.

12. The terminal according to claim 7, wherein the CSI report further comprises an indication field which is used to indicate a CSI measurement resource set corresponding to the first CSI measurement resource indicator, and remaining CSI measurement resource indicators are mapped and arranged according to the preset mapping rule, and determine a correspondence between the first CSI measurement resource indicator and the CSI measurement resource set.

13. A non-transitory readable storage medium, wherein the non-transitory readable storage medium stores a program or instructions, and when the program or instructions are executed by a processor, following steps are implemented:

feeding back, by a terminal, X CSI reports to a network-side device according to a preset mapping rule, wherein the CSI report comprises information about target beams;

the target beams comprise N pairs of first beams that can be simultaneously received by the terminal, wherein N is a positive integer greater than 1; and the preset mapping rule is a mapping rule that matches group-based beam reporting;

wherein the preset mapping rule comprises a first rule; wherein the first rule comprises: a first CSI measurement resource indicator is arranged in a first position, and CSI measurement resource indicators of remaining beams are sequentially arranged in a form of beam pairs, wherein the first CSI measurement resource indicator is a CSI measurement resource indicator corresponding to a beam whose layer 1 measurement value is largest among the N pairs of first beams; and if the first rule is satisfied, the layer 1 measurement value corresponding to the first CSI measurement resource indicator is mapped, and layer 1 measurement values of the remaining beams are mapped based on differences between the layer 1 measurement value corresponding to the first CSI measurement resource indicator and the layer 1 measurement values of the remaining beams.

14. The non-transitory readable storage medium according to claim 13, wherein the CSI report further comprises information for indicating a beam reporting type, the beam reporting type comprises any one of the following: the group-based beam reporting, non-group-based beam reporting, and group-based and non-group-based hybrid beam reporting; and the beam reporting type is configured by the network-side device for the terminal, or determined by the terminal according to a preset rule of the network-side device.

15. The non-transitory readable storage medium according to claim 14, wherein in a case that the beam reporting type is configured by the network-side device, or determined by the terminal according to the preset rule of the network-side device, if the beam reporting type is group-based beam reporting, the terminal selects to report information about the N pairs of first beams that can be simultaneously received by the terminal, wherein target CSI measurement resource indicators in information about each pair of first beams correspond to different CSI measurement resources;

the CSI measurement resources comprise: a CSI measurement resource set.

16. The non-transitory readable storage medium according to claim 13, wherein the information about the target beams comprises at least one of the following: target CSI measurement resource indicators and measurement values of target CSI measurement resources; and the target CSI measurement resource indicators are CSI reference signal resource indicators, CRIs, or system synchronization block resource indicators, SSBRIs, and the measurement values of the target CSI measurement resources are layer 1 measurement values.

17. The non-transitory readable storage medium according to claim 16, wherein in a case that the target CSI report comprises the target CSI measurement resource indicators, the method further comprises:

encoding, by the terminal, the target CSI measurement resource indicators based on a preset encoding mode, wherein the target CSI measurement resource indicators comprise all target CSI measurement resource indicators; and the preset encoding mode comprises: the terminal performs encoding based on a quantity of CMRs configured in a CSI measurement resource set.

18. The non-transitory readable storage medium according to claim 13, wherein the CSI report further comprises an indication field which is used to indicate a CSI measurement resource set corresponding to the first CSI measurement resource indicator, and remaining CSI measurement resource indicators are mapped and arranged according to the preset mapping rule, and determine a correspondence between the first CSI measurement resource indicator and the CSI measurement resource set.

* * * * *